(12) United States Patent
Fujita et al.

(10) Patent No.: US 6,302,487 B1
(45) Date of Patent: Oct. 16, 2001

(54) SEAT HAVING A THREE-DIMENSIONAL NET

(75) Inventors: Hitoshi Fujita; Etsunori Fujita; Yumi Ogura; Kazuyoshi Chizuka; Masaki Nishino; Akihito Asano; Seiji Kawasaki, all of Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 0 days.

(21) Appl. No.: 09/665,074

(22) Filed: Sep. 19, 2000

(30) Foreign Application Priority Data

Sep. 20, 1999 (JP) .................................... 11-265404

(51) Int. Cl.[7] ....................................... A47C 7/02
(52) U.S. Cl. ........................................ 297/452.56
(58) Field of Search ....................... 297/452.56, 452.63, 297/452.64, 452.18, 452.1, 218.3, 218.5, 218.1, 219.1, 228.13

(56) References Cited

U.S. PATENT DOCUMENTS 5,013,089  5/1991  Abu-Isa et al. .
6,152,534  * 11/2000  Maeda et al. .

* cited by examiner

Primary Examiner—Milton Nelson, Jr.
(74) Attorney, Agent, or Firm—Wenderoth, Lind & Ponack, L.L.P.

(57) ABSTRACT

A seat includes a seat cushion frame, a seat back frame mounted to the seat cushion frame, and at least one three-dimensional net having upper and lower mesh layers and a pile layer made up of a large number of piles for connecting the upper and lower mesh layers. The three-dimensional net is stretched over substantially the entire region of the seat cushion frame and the seat back frame, thereby forming a seat cushion and a seat back. The three-dimensional net has a fixed end at a front end portion of the seat cushion and another fixed end at an upper end portion of the seat back. The seat also includes a first tension member attached to the three-dimensional net at a location adjacent to a central portion thereof for imparting tension thereto, and a second tension member attached to another portion of the three-dimensional net for fastening it to at least one of the seat cushion frame and the seat back frame.

5 Claims, 33 Drawing Sheets

SEAT HAVING A THREE-DIMENSIONAL NET

BACKGROUND OF THE INVENTION

1. Field of the Invention

The present invention relates to a seat capable of absorbing forces that act on a seat occupant and enhancing the posture-retaining properties by employing a three-dimensional net having a large hysteresis loss and a high damping capacity.

2. Description of the Related Art

Conventional automobile seats generally include spring members attached to a seat frame, a pad material such as a foamed material, rocking material, or cotton placed thereon, and a skin such as a vinyl leather, woven cloth, or leather covered thereon.

Japanese Laid-open Utility Model Publication (unexamined) No. 5-72250 discloses a support structure for a seat wherein a stretch cloth having lateral stretch properties is fastened to opposite sides of a generally rectangular support frame, and a pad material is placed on the stretch cloth. Alternatively, in place of the stretch cloth, a generally flat support member called "PULLMAFLEX" is fastened to the opposite sides of the support frame via a plurality of coil springs.

Japanese Laid-open Patent Publication (unexamined) No. 6-55961 discloses a seat of a structure having a spring member called "Wire grid suspension" fastened to opposite sides of a support frame via a plurality of coil springs, and a pad material placed on the spring member.

In order to enhance the damping capacity or shock-absorbing properties, those in which a viscoelastic material is embedded in the pad material have been proposed.

On the other hand, seats other than automobile seats generally include a pad material placed on the frame and covered with a skin, and some of them also include spring members for enhancing the cushioning characteristics.

Although the spring members or the pad material acts to provide desired cushioning characteristics, conventional seats are mostly thick, heavy and costly.

Furthermore, In the automobile seats, when an acceleration is applied to the body of the seat occupant, a reaction force is created by the pad material or spring members, and a relative displacement between the thoracic vertebra and the pelvis causes a burden on the lumbar. In addition, slippage of the hip following rotation of the pelvis changes the posture and, hence, muscles are used to retain the posture, giving rise to muscle fatigue or lower back pain.

Because the support structure disclosed in Japanese Laid-open Utility Model Publication No. 5-72250 or the seat disclosed in Japanese Laid-open Patent Publication No. 6-55961 employs an elastic member having a small hysteresis loss, the vibration transmissibility is improved in a high-frequency region, but it is difficult for the seat to sufficiently reduce a resonant peak in a low-frequency region and to absorb an acceleration applied to the human body.

SUMMARY OF THE INVENTION

The present invention has been developed to overcome the above-described disadvantages.

It is accordingly an objective of the present invention to provide a seat having a three-dimensional net that is superior in vibration-absorbing properties and in inertia force-absorbing properties and capable of providing a superior body pressure distribution and following a change in posture to desirably support the pelvis and the spinal column.

Another objective of the present invention is to provide the seat of the above-described type which is thin, light and inexpensive.

In accomplishing the above and other objectives, the seat according to the present invention includes a seat cushion frame, a seat back frame mounted to the seat cushion frame, and a first three-dimensional net having upper and lower mesh layers and a pile layer having a large number of piles for connecting the upper and lower mesh layers. The first three-dimensional net is stretched over substantially an entire region of the seat cushion frame and the seat back frame, thereby forming a seat cushion and a seat back. The first three-dimensional net has a fixed end at a front end portion of the seat cushion and another fixed end at an upper end portion of the seat back. The seat according to the present invention also includes a first tension member attached to the first three-dimensional net at a location adjacent to a central portion thereof for imparting tension thereto, and a second tension member attached to another portion of the first three-dimensional net for fastening the first three-dimensional net to at least one of the seat cushion frame and the seat back frame.

This seat is of a vibration-absorbing structure utilizing a relative displacement between the seat back and the seat cushion. Also, this seat is light and inexpensive, requires a reduced space, and provides a superior body pressure distribution, compared with the conventional seat comprised of urethane and/or springs.

Furthermore, the provision of a hammock structure wherein the three-dimensional net of a high damping material has fixed ends at a front end portion and an upper end portion does not allow the pelvis to rotate even if the seat occupant sits thereon for a long time. A change in posture of the seat occupant is followed by a change in the pile layer and a change in external shape of the three-dimensional net, making it possible to softly support the flexible pelvis.

Advantageously, the seat cushion frame and the seat back frame are selectively covered with a pad material, which is in turn covered with a skin, making it possible to provide a soft riding comfort without any feeling of foreign substances.

Each of the first and second tension members includes one of a highly elastic three-dimensional net, a metal spring, and a stretch material made of rubber. Such tension members act to strengthen the spring properties and absorb high-frequency vibrations by creating an anti-phase.

The seat may further include a second three-dimensional net laminated on the first three-dimensional net. The laminated structure of the three-dimensional nets provides soft spring properties while strengthening the damping properties, making it possible to absorb vibrations and provide a soft riding comfort.

A pad material may be interposed between the first and second three-dimensional nets to absorb the high-frequency vibrations.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

Figure 1:
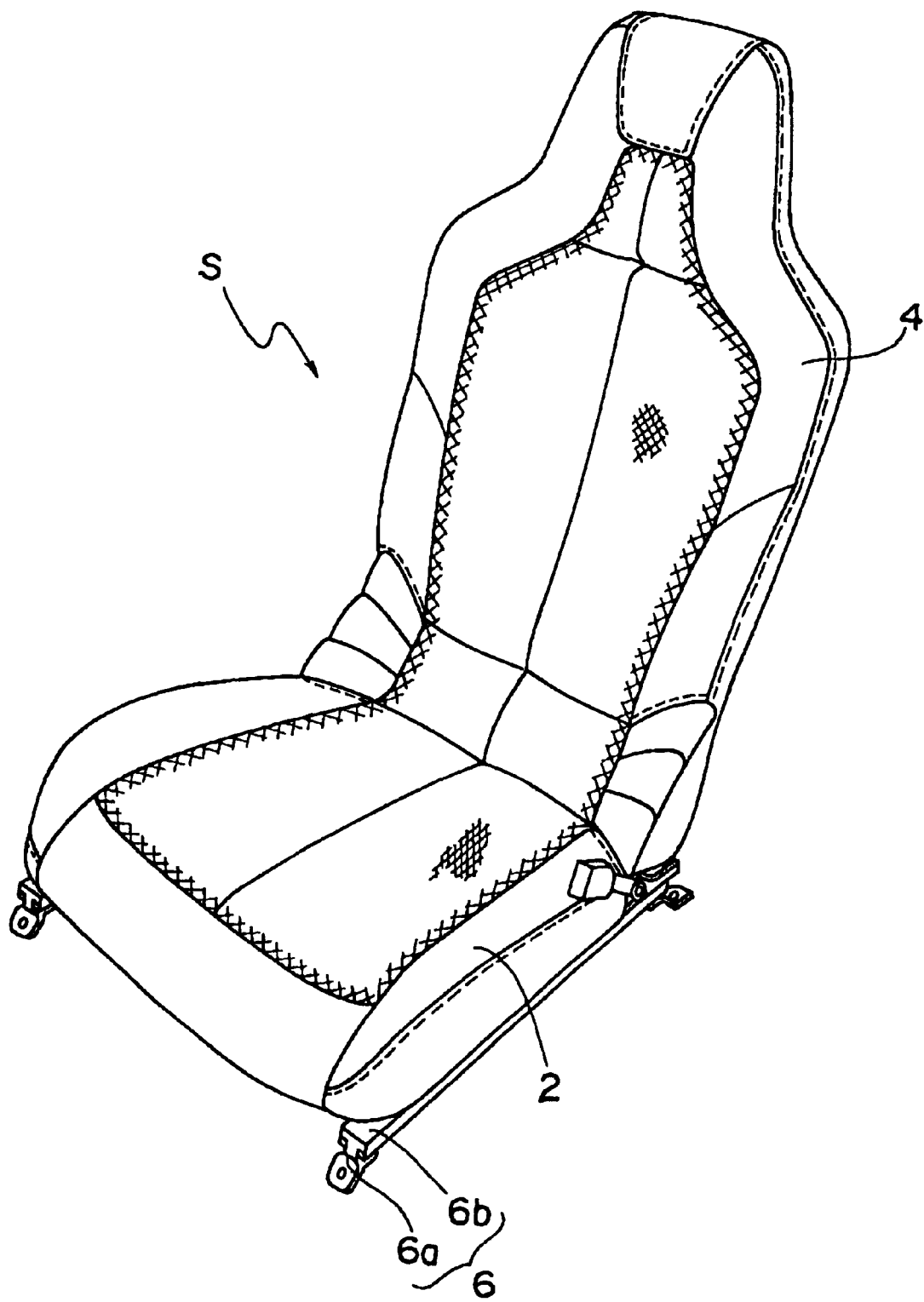
FIG. 1 is a perspective view of a seat having a three-dimensional net according to the present invention.

This application is based on an application No. 11-265404 filed Sept. 20, 1999 in Japan, the content of which is herein expressly incorporated by reference in its entirety.

It is well known that external forces that adversely affect the seating comfort during a drive in a car include vibration transmitted from the automobile floor and an inertia force generated as a result of running of the car. It is also well known that factors that affect the seating comfort include, in the order of severity, the form of support for the seat occupant's posture, the pattern of distribution of the seat occupant's weight, the capability of absorbing vibrations and impacts and so on.

The problems of visceral dysfunction and lower back pain may be alleviated if the seat occupant is adequately supported and protected against the vibration and the inertia force transmitted from the automobile floor. To avoid those problems, it is important for the whole body, in particular the lumbar, to be adequately and comfortably supported to minimize slippage of the pelvis of the seat occupant relative to the automobile seat assembly. For this purpose, much consideration has to be centered on how the tuber ischiadicum can be utilized as a pivot point to allow the seat to deform consistently in pursuit of change in posture of the seat occupant and also how the inertia force imposed externally upon the seat occupant can be absorbed sufficiently.

In view of the above, in terms of statics, the lumbar flexures have to be retained in an anatomically natural position with adequate force with respect to the tuber ischiadicum and, on the other hand, in terms of dynamics, the capability of following up the change in posture of the seat occupant due to muscle fatigue has to be improved to substantially eliminate the difference in phase between the pelvis and various portions of the spinal column and a forward slippage of the tuber ischiadicum. Accordingly, the seat assembly has to be so designed and so configured as to allow the seat back to undergo a change about the tuber ischiadicum to suppress the forward slippage in the event that the pelvis of the seat occupant is likely to retrodisplace, as to allow the seat occupant to retain his or her position with minimized muscular force, and as to exhibit the characteristics in which the deflection is kept substantially unchanged against a change in load by increasing the hysteresis loss to absorb the force.

The two-dimensional mesh structure generally employed in an office chair known as "AERON CHAIR" satisfies requirements that the chair be thin and lightweight, but is insufficient in its vibration and impact absorbing characteristics and supportability. Accordingly, such a two-dimensional mesh structure has not been employed in an automobile seat assembly.

In view of the foregoing, the inventors of the present invention have conducted a series of studies to present a net of a three-dimensional structure that can provide a seat performance quite different from that hitherto afforded.

More specifically, the use of the three-dimensional net (hereinafter referred to as 3-D net) of a high damping characteristic is effective to exhibit preferentially an elastic characteristic to a small input, but an attenuating effect to a large input makes it possible to provide a seat assembly having a seat cushion and a seat back integrated together by the 3-D net to support the body of a seat occupant in a manner as if supported in a hammock. The external force is passively counteracted by a vibration model having multiple degrees of freedom while allowing the external force to be absorbed in response to the external force. With this, not only can the fitness brought about by a dynamic smooth dispersion of the seats occupant's weight in consistency with chance in posture that occurs during some driving conditions and long periods of cruising be increased, but the capability of retaining the posture and the capability of absorbing the inertia force and the vibration can also be increased.

The 3-D net having a low linearity is effective to provide a support structure of a kind that is not forced to conform to the shape of the lumbar, but deforms in conformity with a mechanism of movement of the anatomical skeleton or the body of the seat occupant with the pelvis or the tuber ischiadicum serving as a point of pivot. Therefore, the 3-D net is effective to secure the shape of a center portion of the seat adjacent the pelvis of the seat occupant and also to dynamically respond to change in posture and the external force.

Preferred embodiments of the present invention are discussed hereinafter with reference to the accompanying drawings.

Figure 2:
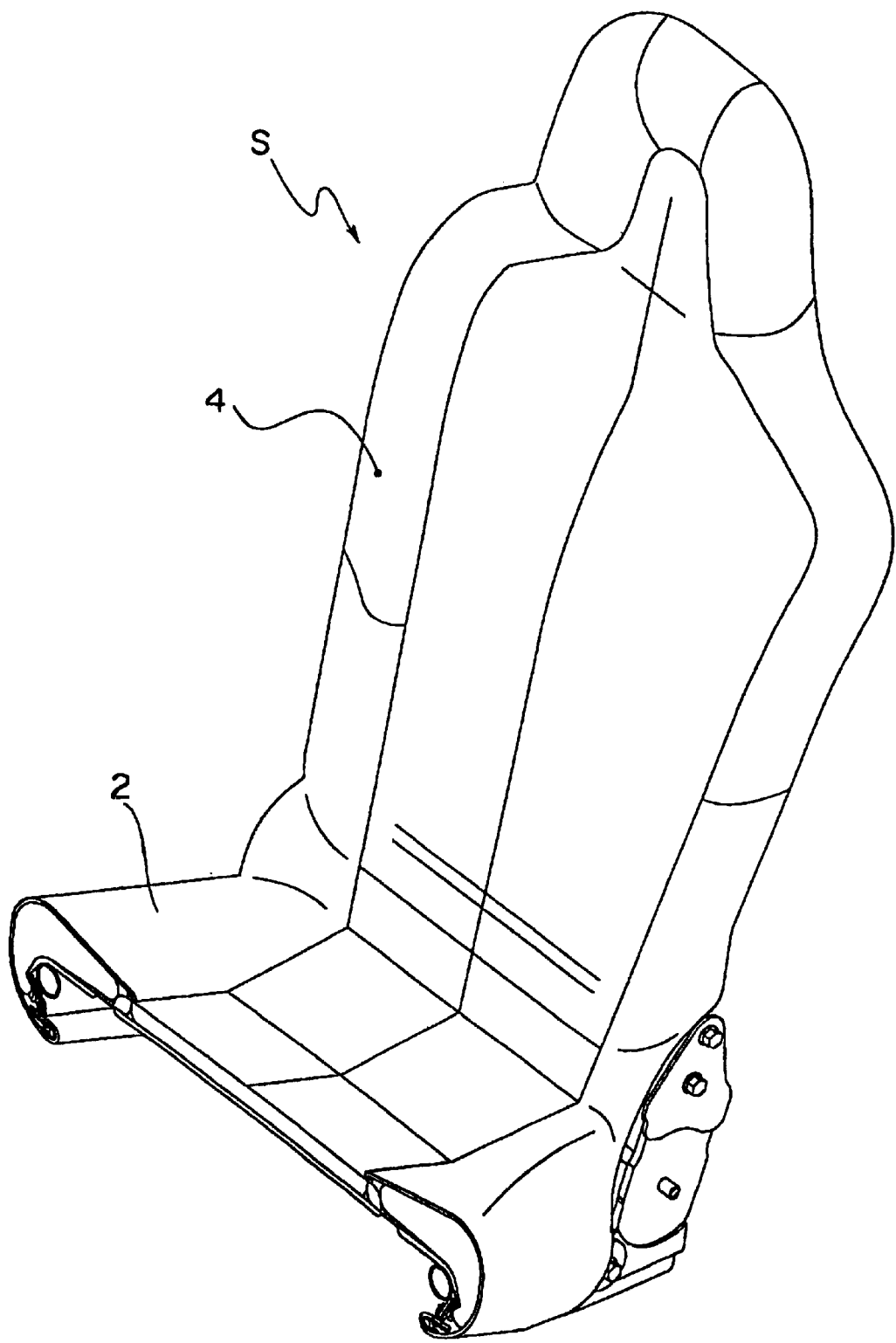
FIG. 2 is a perspective view, partly in section, of the seat of FIG. 1.

FIGS. 1 and 2 depict a seat S having a 3-D net according to the present invention, which includes a seat cushion 2 and a seat back 4 pivotally mounted on the seat cushion 2. This seat S is used as an automobile seat and is mounted on a seat slide device 6 secured to the vehicle body (not shown). The seat slide device 6 includes a pair of lower rails 6a secured to the vehicle body and a pair of upper rails 6b slidably mounted on respective lower rails 6a. The seat S is mounted on the upper rails 6b.

Figure 3:
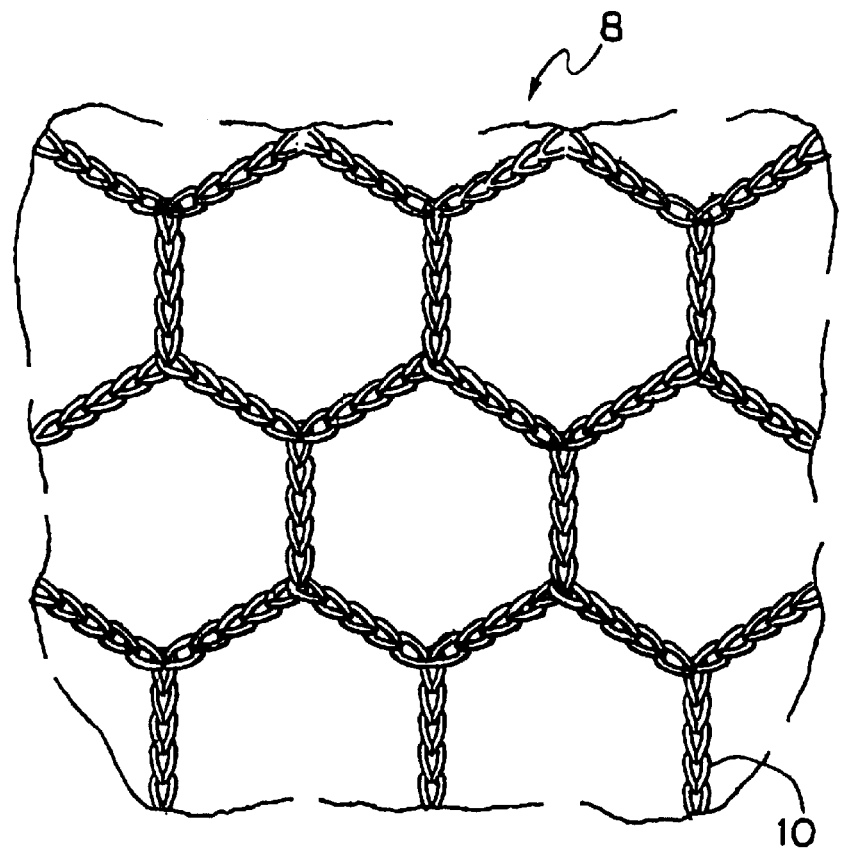
FIG. 3 is a fragmentary front view on an enlarged scale, of the three-dimensional net.
Figure 4:
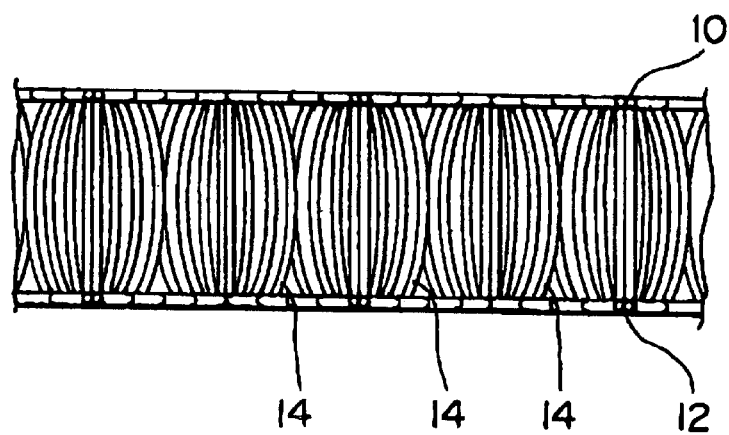
FIG. 4 is a fragmentary side view of the three-dimensional net of FIG. 3.

FIGS. 3 and 4 depict a three-dimensional mesh knit forming a 3-D net 8, which has a fabric base formed into a honeycomb-shaped (hexagonal) mesh. The mesh knit is of a three-layered solid truss structure in which an upper mesh layer 10 and a lower mesh layer 12 are connected to each other by a pile layer having a large number of piles 14.

Each yarn of the upper mesh layer 10 and the lower mesh layer 12 is formed by twisting a number of fine threads, while each of the piles 14 is formed of a single thick string to provide the three-dimensional mesh knit with rigidity.

Table 1 shows physical values of various 3-D nets 8 in the case where polyethylene terephthalate (PET) is used for the three-dimensional mesh knit.

TABLE 1

| Item | | 09016D | 09019D | 09030D | 09030D-2 | 09034D | 09038D | 09041D | 09049D | 09052D-1 | 09060D |
|---|---|---|---|---|---|---|---|---|---|---|---|
| Weight (g/m$^2$) | | 1272.0 | 1384.0 | 640.0 | 652.0 | 1440.0 | 1080.0 | 1160.0 | 968.0 | 1492.0 | 1152.0 |
| Thickness (mm) | | 13.7 | 14.3 | 5.0 | 6.5 | 13.4 | 12.7 | 11.8 | 13.1 | 13.6 | 13.0 |
| Pull Strength | warp | 184.6 | 118.2 | 132.9 | 118.7 | 122.5 | 174.1 | 131.5 | 147.5 | 116.9 | 130.9 |
| (kg/50 mm) | weft | 83.7 | 124.2 | 95.1 | 65.2 | 171.8 | 105.4 | 105.7 | 75.5 | 105.9 | 110.0 |
| Elongation | warp | 73.0 | 70.6 | 59.0 | 59.4 | 93.3 | 62.6 | 62.4 | 67.1 | 70.2 | 59.1 |
| (%) | weft | 120.7 | 73.5 | 114.1 | 135.1 | 91.2 | 125.9 | 124.5 | 111.2 | 103.3 | 70.4 |
| Tear Strength | warp | 98.6 | 101.9 | 53.2 | 62.7 | 83.0 | 105.0 | 82.5 | 70.8 | 78.2 | 88.0 |
| (kg) | weft | 63.5 | 74.1 | 43.8 | 33.4 | 92.1 | 65.3 | 42.0 | 57.8 | 60.5 | 69.8 |
| Strain After | warp | 1.2 | 2.0 | 1.9 | 1.8 | 2.5 | 3.0 | 1.7 | 1.4 | 2.5 | 2.7 |
| Repeated Load (%) | weft | 13.1 | 0.5 | 24.9 | 7.7 | 2.5 | 12.3 | 13.5 | 9.9 | 3.4 | 2.0 |
| Surface Wearability | warp | 4 | 4–5 | 4–5 | 4–5 | 4–5 | 4 | 4–5 | 4 | 4–5 | 4–5 |
| (grade) | weft | 4 | 4–5 | 4–5 | 4 | 4 | 3–4 | 4–5 | 3–4 | 4–5 | 4–5 |
| Compressibility (%) | | 47.9 | 14.8 | 29.0 | 15.8 | 16.1 | 61.4 | 39.7 | 64.2 | 35.8 | 62.0 |
| Elastic Modulus (%) | | 94.6 | 88.2 | 92.2 | 80.8 | 90.7 | 95.6 | 92.5 | 93.9 | 94.3 | 94.9 |
| Elongation under | warp | 20.0 | 20.5 | 22.5 | 20.1 | 20.6 | 22.0 | 20.9 | 26.7 | 27.1 | 28.3 |

TABLE 1-continued

| | | Item No. | | | | | | | | |
|---|---|---|---|---|---|---|---|---|---|---|
| Item | | 09016D | 09019D | 09030D | 09030D-2 | 09034D | 09038D | 09041D | 09049D | 09052D-1 | 09060D |
| Constant Load (%) | weft | 65.3 | 27.1 | 56.2 | 89.5 | 21.3 | 55.1 | 75.0 | 55.9 | 43.7 | 34.3 |
| Residual Strain | warp | 1.1 | 0.3 | 1.3 | 0.9 | 0.9 | 0.2 | 0.7 | 0.5 | 1.2 | 0.7 |
| (%) | weft | 7.3 | 1.3 | 5.9 | 19.4 | 0.0 | 2.4 | 5.2 | 2.5 | 2.1 | 0.4 |

In Table 1, the pulling strength "kg/50 mm" is a strength when a mesh having a width of 50 mm has been pulled in the longitudinal direction. Furthermore the test method conforms to JASO.

Thermoplastic resins are preferably used as the material of the three-dimensional mesh knit, and it is sufficient if the material can be formed into fibers. When textiles are made of such material, it is sufficient if it provides a strength required for a sheet stock. Typical examples are thermoplastic polyester resins such as polyethylene terephthalate (PET), polybutylene terephthalate (PBT), etc., polyamide resins such as nylon-6, nylon-66, etc., polyolefin resins such as polyethylene, polypropylene, etc., and resins in which more than two kinds of such resins are mixed.

The fiber thickness of each pile 14 is greater than 380$d$ and, preferably, greater than 600$d$ so that the load of a seat occupant applied to the three-dimensional mesh knit can be supported by deformation of the hexagonal meshes and by inclination of the piles, thereby providing a soft structure that causes no stress concentration.

Figure 5A:
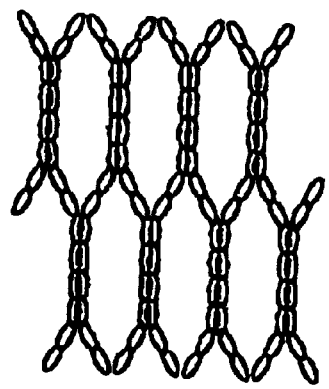
FIG. 5A is a schematic view of a fabric base texture used for upper and lower mesh layers of the three-dimensional net, particularly depicting a honeycomb-shaped (hexagonal mesh shown in FIG. 3.
Figure 5B:
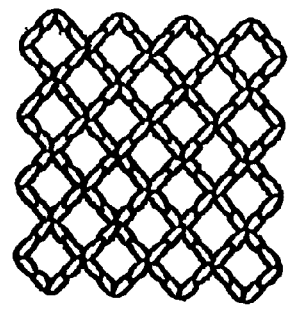
FIG. 5B is a view similar to FIG. 5A, but particularly depicting a diamond-shaped mesh.
Figure 5C:
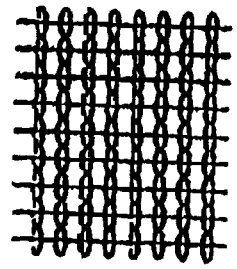
FIG. 5C is a view similar to FIG. 5A, but particularly depicting a chain-inserted texture.

FIGS. 5A to 5C schematically depict several fabric base textures used for the upper and lower mesh layers 10, 12. In particular, FIG. 5A depicts a honeycomb-shaped (hexagonal) mesh shown in FIG. 3, FIG. 5B a diamond-shaped mesh, and FIG. 5C a chain-inserted texture. The chain-inserted texture is used as a texture for enhancing the rate of hysteresis loss by accentuating the damping characteristics.

Figure 6A:
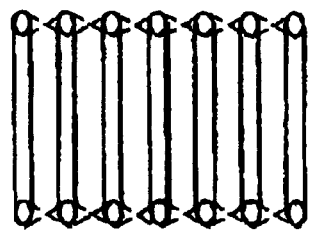
FIG. 6A is a schematic view of a pile texture connecting the upper and lower mesh layers, particularly depicting a generally straight texture corresponding to FIG. 4.
Figure 6B:
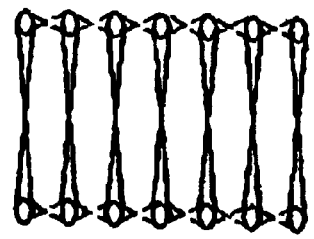
FIG. 6B is a view similar to FIG. 6A, but particularly depicting a generally straight texture in the form of a FIG. "8"
Figure 6C:
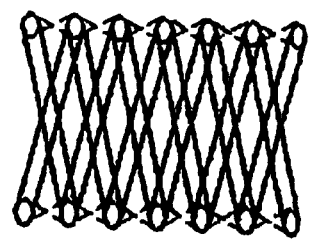
FIG. 6C is a view similar to FIG. 6A, but particularly depicting a cross texture.
Figure 6D:
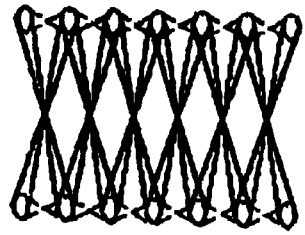
FIG. 6D is a view similar to FIG. 6A, but particularly depicting a cross texture in the form of a FIG. "8"

FIGS. 6A to 6D schematically depict several pile textures connecting the upper and lower mesh layers 10, 12. In particular, FIG. 6A depicts a generally straight texture corresponding to FIG. 4, FIG. 6B a generally straight texture in the form of a figure "8", FIG. 6C a cross texture, and FIG. 6D a cross texture in the form of a figure "8".

Figure 7A:
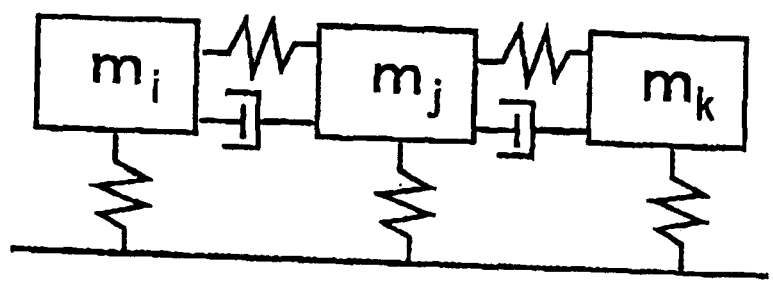
FIG. 7A is a schematic view of a three-dimensional net model when the three-dimensional net was placed on a rigid body.
Figure 7B:
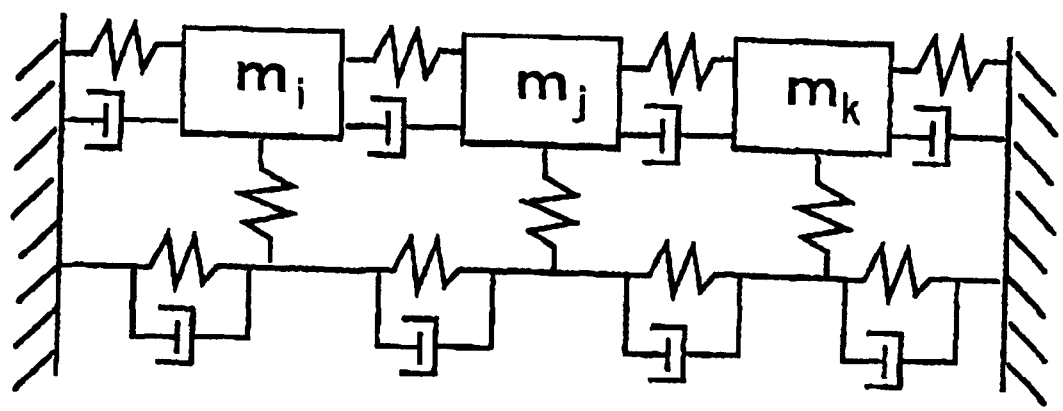
FIG. 7B is a schematic view of another three-dimensional net model when the three-dimensional net was hung at opposite sides.

FIGS. 7A and 7B schematically depict 3-D net models. In particular, FIG. 7A depicts the case in which the 3-D net was placed on a rigid body, while FIG. 7B depicts the case in which the 3-D net was hung at opposite sides. The model of FIG. 7B constitutes a main spring system with piles in the form of "X" or "I" and a damping system with friction between the piles. That is, the presence of a hammock-shaped structure imparts elasticity notwithstanding the high damping. In order to enhance the elasticity, the elasticity of the piles is made soft to accentuate the linearity, the load is supported by a two degrees of freedom structure comprised of the seat back and the seat cushion, and vibrations are absorbed by a behavior similar to that of a dynamic damper, there by making a transfer function utilizing an antiresonant state.

Figure 8:
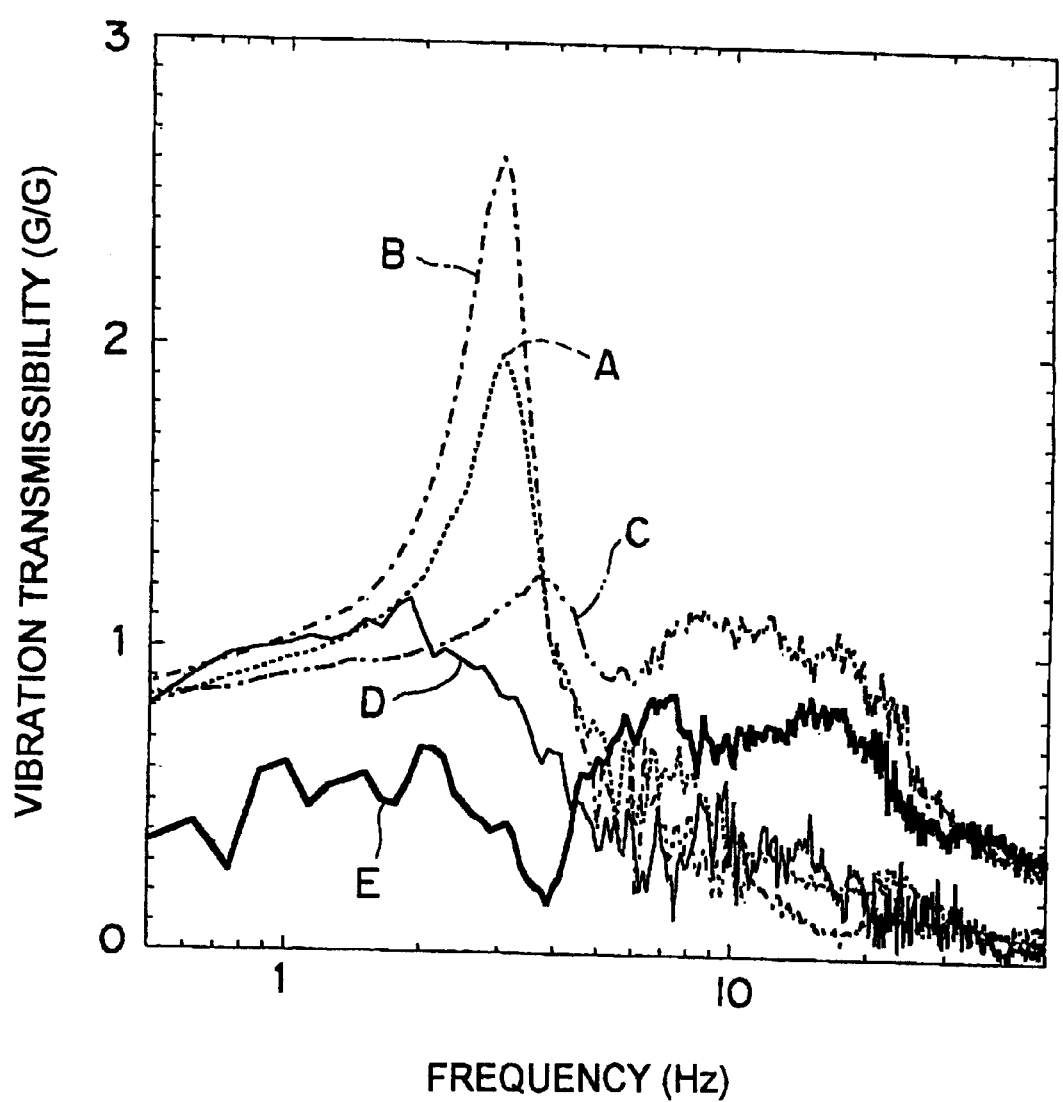
FIG. 8 is a graph showing the vibration transmissibilities of conventional seats and those of the seats according to the present invention.

FIG. 8 is a graph showing transfer functions of the seats having a 3-D net according to the present invention and transfer functions of conventional seats. In the FIG., "A" represents a conventional seat employing urethane for the pad material, and "B" represents a conventional seat wherein urethane as the pad material is elastically supported by metal springs. Also, "C" represents a 3-D net seat having a single layered structure, "D" represents a seat wherein the 3-D net seat is elastically supported by metal springs, and "E" represents a 3-D net seat having a laminated structure. The detailed structures of the 3-D net seats are explained later.

As can be seen from the graph of FIG. 8, the 3-D net seats according to the present invention satisfactorily reduce a resonant peak in a low-frequency region, and absorb an acceleration inputted to the human body.

Figure 9:
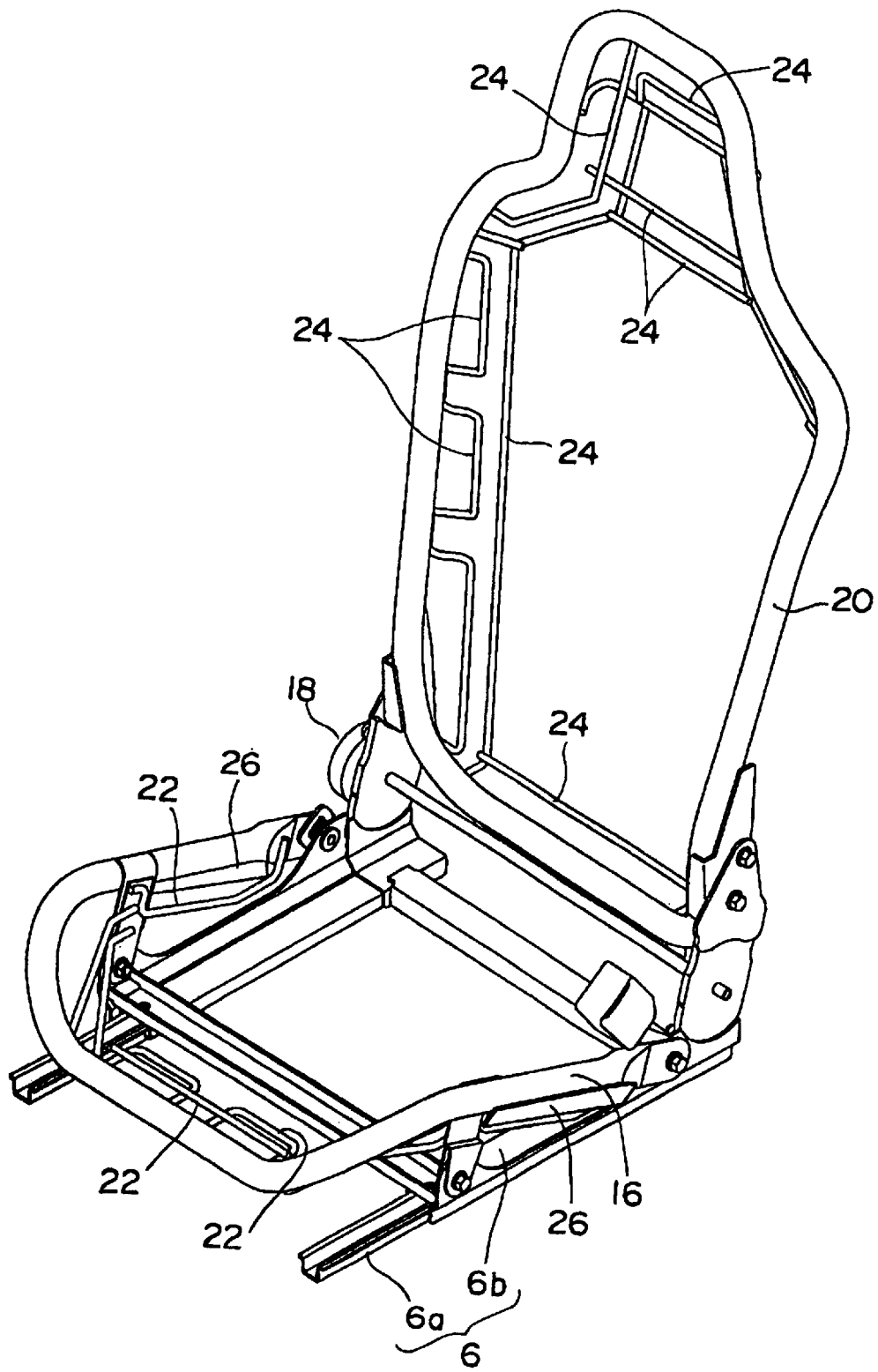
FIG. 9 is a perspective view of a frame structure employed in the seat of FIG. 1.

FIG. 9 depicts a frame structure of the seat S according to the present invention, which includes a seat cushion frame 16 secured to the upper rails 6$b$ and a seat back frame 20 pivotally mounted on the seat cushion frame 16 via a reclining mechanism 18. A plurality of wires 22, 24 are joined to each of the seat cushion frame 16 and the seat back frame 20 to stretch the 3-D net 8 over the full length thereof, and two plates 26 are joined to the seat cushion frame 16 on respective sides thereof to stretch the 3-D net 8 for the seat cushion.

FIGS. 10 to 13 depict a seat S1 according to a first embodiment of the present invention, which includes two 3-D nets 8$a$, 8$b$ having different damping and spring characteristics and laminated one upon another over substantially the entire region of the seat cushion 2 and the seat back 4 so that the spring properties (elasticity) imparted in the direction perpendicular to the 3-D net plane may reduce a resonant frequency. As the 3-D nets 8$a$, 8$b$, those identified by 09060D and 09030D in Table 1 are preferably used, respectively.

The 3-D nets fastened to a front end portion of the seat cushion 2 and an upper end portion of the seat back 4 have a smaller elongation in the longitudinal direction than the elongation in the widthwise direction in which supporting properties are required.

Figure 10:
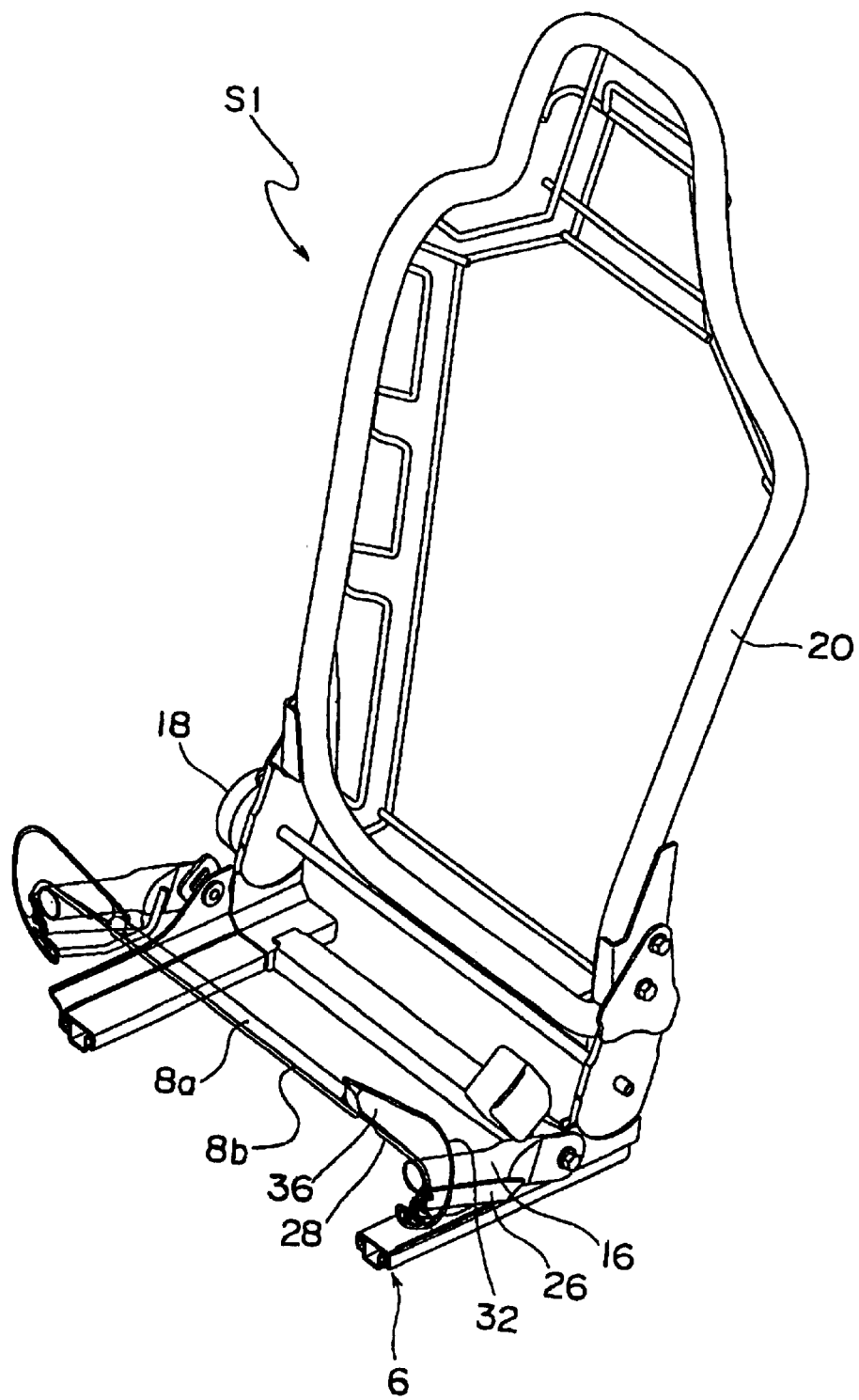
FIG. 10 is a perspective view, partly in section, of a seat according to a first embodiment of the present invention.
Figure 12:
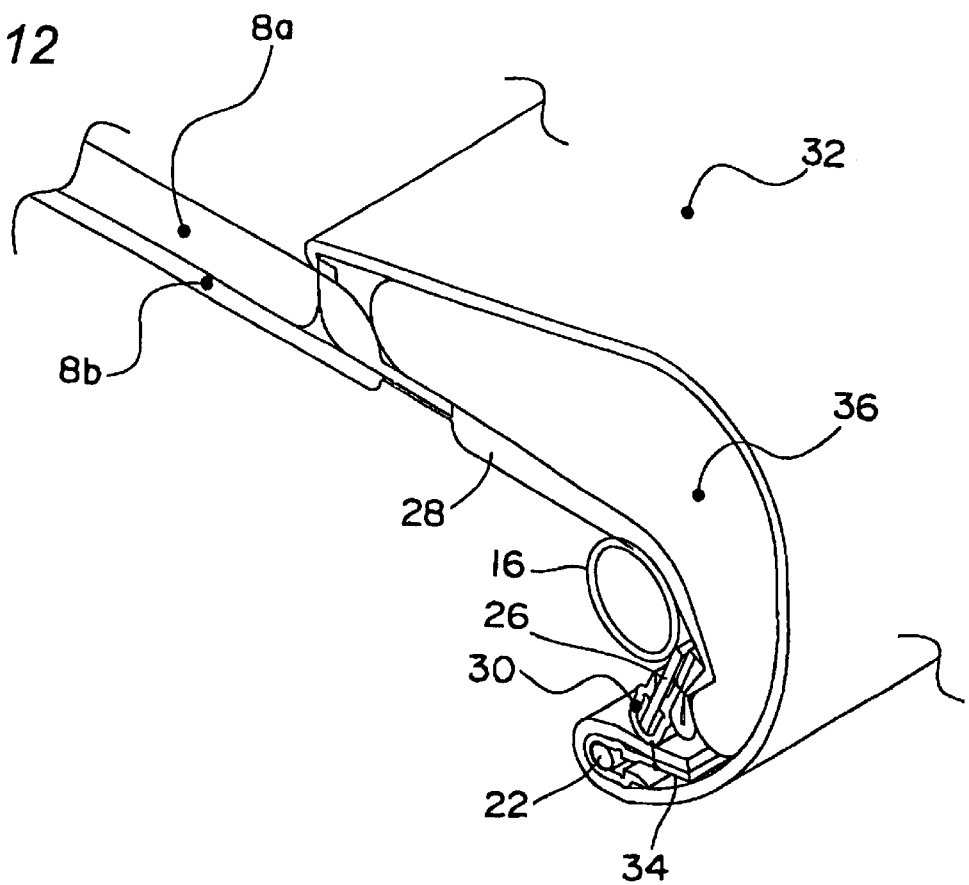
FIG. 12 is a perspective view, partly in section, of a side portion of a seat cushion where the three-dimensional net is fastened to a seat cushion frame.

More specifically, because the seat cushion 2 is required to have the spring properties, a side edge portion of the upper 3-D net 8$a$, a side edge portion of the lower 3-D net 8$b$ having substantially the same size as the upper 3-D net 8$a$, and an inner edge portion of a tension member 28 such, for example, as a highly elastic 3-D net or the like are joined together by vibration welding on each side of the seat cushion 2, as shown in FIGS. 10 and 12. After an intermediate portion of the tension member 28 has been brought into contact with the seat cushion frame 16, an engagement member 30 made of hard resin and joined to an outer edge portion of the tension member 28 by vibration welding is engaged with the corresponding plate 26. The tension member 28 may be the lower 3-D net 8$b$. In this case, the lower 3-D net 8$b$ is formed wider than the upper 3-D net 8$a$, and the side edge portion of the upper 3-D net 8$a$ is joined to the lower 3-D net 8$b$ at a location inwardly of the seat cushion frame 16, while an outer edge portion of the lower 3-D net 8$b$ is joined to the engagement member 30. Furthermore, the upper 3-D net 8$a$ is sewn to an inner edge portion of a skin 32 at a location inwardly of the joining area with the lower 3-D net 8B, while an outer edge portion of the skin 32 is joined to an engagement member 34 made of a hard resin by vibrating welding. The engagement member 34 is engaged with the wire 22. A urethane-based pad material 36 is interposed between the skin 32 and the tension member 28 to relieve the feeling of foreign substances in sitting conditions.

Figure 13:
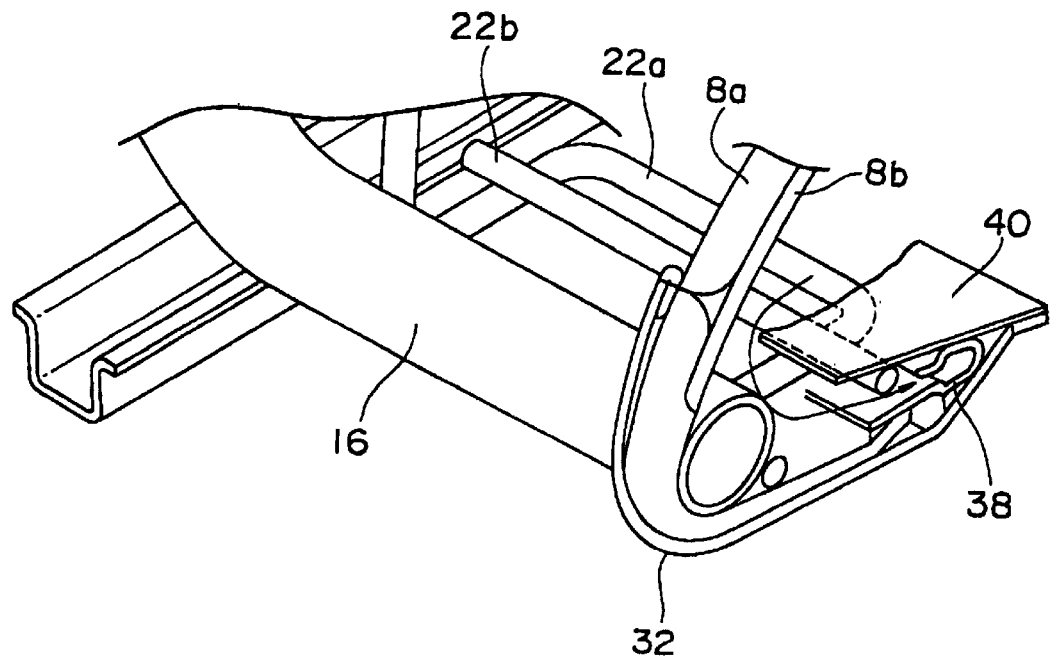
FIG. 13 is a perspective view, partly in section, of a front portion of the seat cushion where the three-dimensional net is fastened to the seat cushion frame.

As shown in FIG. 13, at the front end portion of the seat cushion 2, the lower 3-D net 8b is joined to the lower surface of the upper 3-D net 8a by vibration welding in the proximity of the seat cushion frame 16, and the upper 3-D net 8a is sewn to an inner edge portion of the skin 32 at a location inwardly of the seat cushion frame 16. An outer edge portion of the upper 3-D net 8a is joined to at least one engagement member 38 by vibration welding, which is engaged with a generally U-shaped wire 22a. An outer edge portion of the skin 32 is joined to an engagement plate 40 made of a hard resin by vibration welding, which is in turn engaged with a straight wire 22b.

The upper end portion of the seat back 4 is fastened to the seat back frame 20 in the same manner as the front end portion of the seat cushion 2. That is, as shown in FIG. 1, the same members as the engagement members 38, 40 are engaged with a generally U-shaped wire 24a and a straight wire 24b, respectively. However, as is the case with the opposite side portions of the seat cushion 2, a urethane-based pad material 42 is interposed between the skin 32 and the upper 3-D net 8A to relieve the feeling of foreign substances in sitting conditions.

Opposite side portions of the seat back 4 are fastened to the seat back frame 20 in the same manner as the upper end portion of the seat back 4 or as the opposite side portions of the seat cushion 2. That is, the 3-D nets are fastened to a wire secured to the seat back frame 20 via an engagement member or via a tension member and an engagement member.

Figure 11:
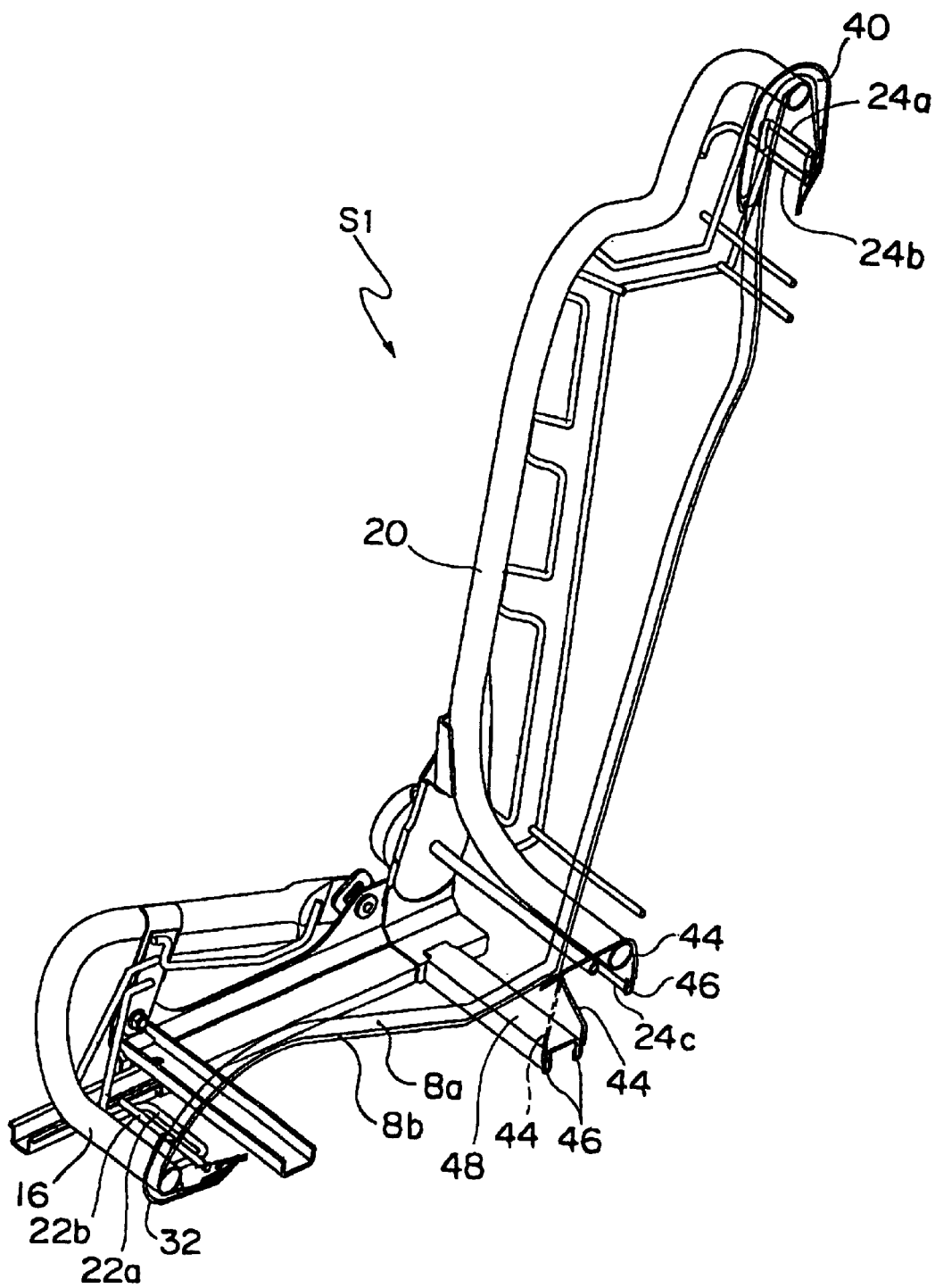
FIG. 11 is another perspective view, partly in section, of the seat of FIG. 10.
Figure 14:
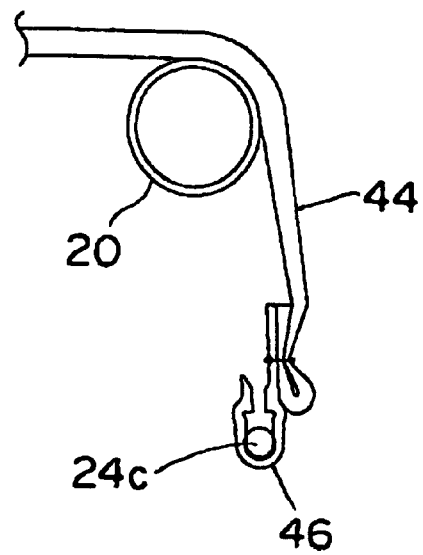
FIG. 14 is a sectional view of a boundary region between the seat cushion and a seat back.

At central portions of the 3-D nets 8a, 8b (a boundary region between a portion of the seat cushion 2 with which the hip of the seat occupant is brought into contact and the seat back 4), the 3-D nets 8a, 8b are joined to inner edge portions of a plurality of tension members 44 such, for example, as highly elastic 3-D nets or the like by vibration welding. As shown in FIGS. 11 and 14, one of the tension members 44 is held in contact with the seat back frame 20 positioned rearwardly thereof, and an engagement member 46 made of a hard resin and joined to an outer edge portion thereof by vibration welding is engaged with a wire 24c secured to the seat back frame 20. Also, the other tension members 44 are joined at outer edge portions thereof to respective engagement members 46 made of a hard resin by vibration welding, which are in turn engaged with a connecting member 48 that connect the two upper rails 6a to each other.

As described above, the 3-D nets have fixed ends at least at the front and upper end portions, and are fastened at the central portions thereof to a portion of the frame via the tension members 44. Accordingly, the seat S1 presents a three-dimensional hammock structure in which the 3-D nets have a predetermined tension.

Figure 15:
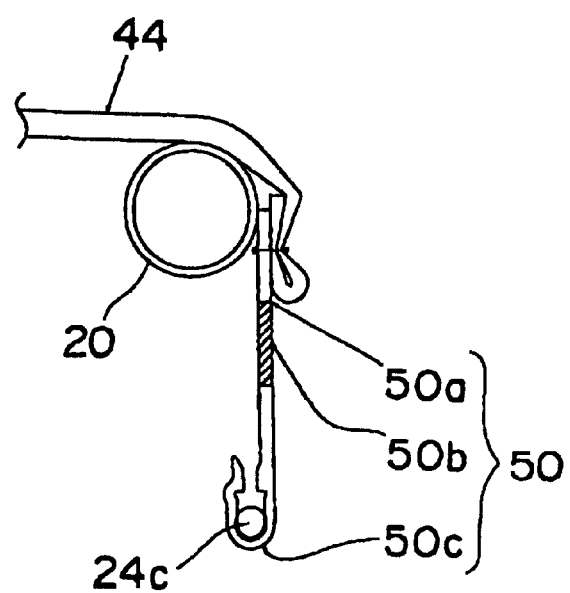
FIG. 15 is a view similar to FIG. 14, but depicting a modification thereof.

FIG. 15 depicts a modification of the engagement member 46 shown in FIG. 14. This engagement member 50 has a joint portion 50a made of a hard resin, a stretch material 50b of, for example, rubber joined to the joint portion 50a, and an engagement portion 50c made of a hard resin and joined to the stretch material 50b. The engagement portion 50c is engaged with the wire 24c. The construction of FIG. 15 is applicable to the fastening of the edge portions of the seat cushion 2 and the seat back 4.

Figure 16:
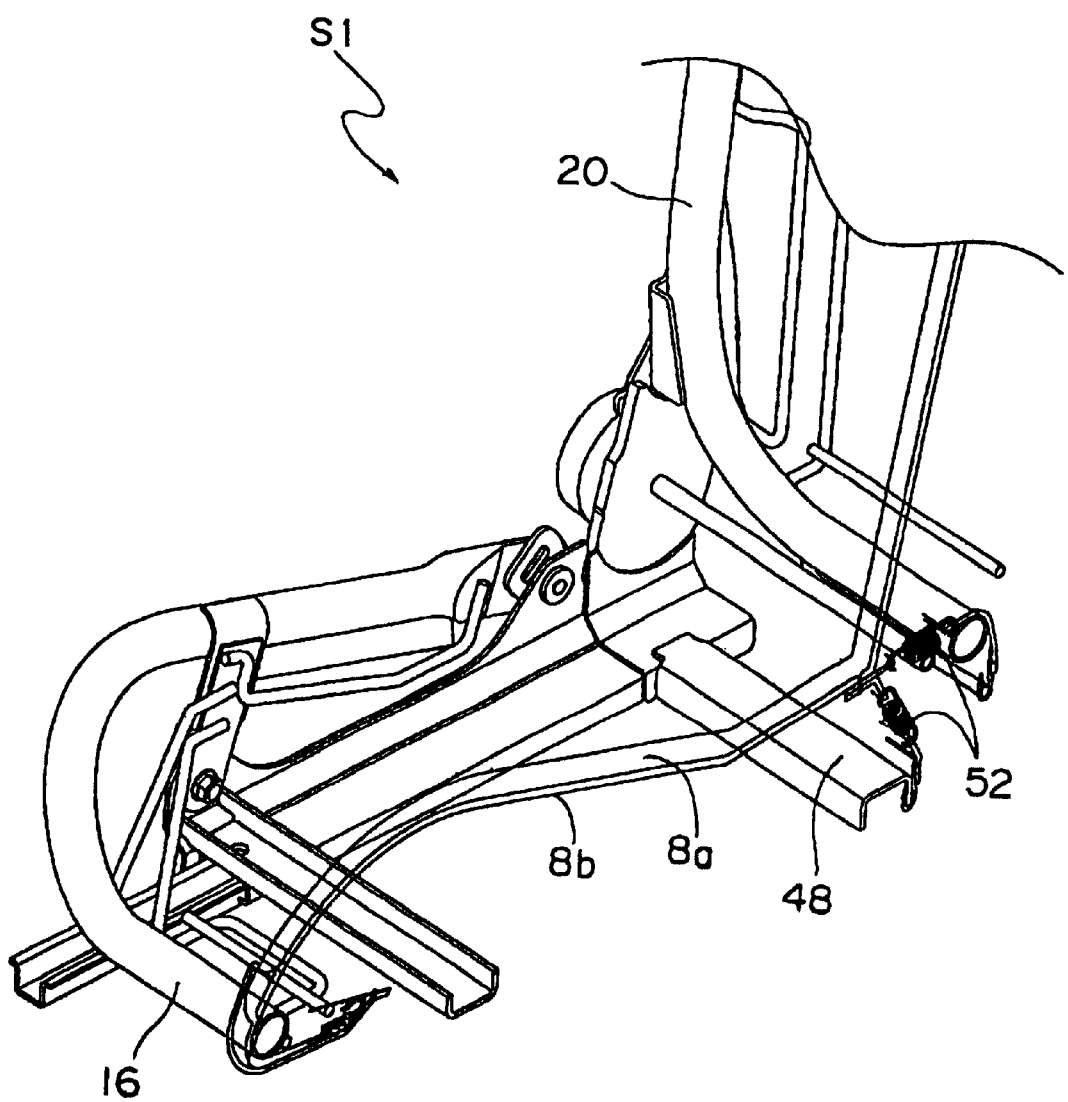
FIG. 16 is a perspective view, partly in section, of a modified form of the boundary region of FIG. 14.

As shown in FIG. 16, a plurality of metal springs 52 may be employed as the tension members. In this case, the boundary region between the seat cushion 2 and the seat back 4 is fastened to a portion of the frame by making use of elastic forces of the metal springs 52.

Figure 17:
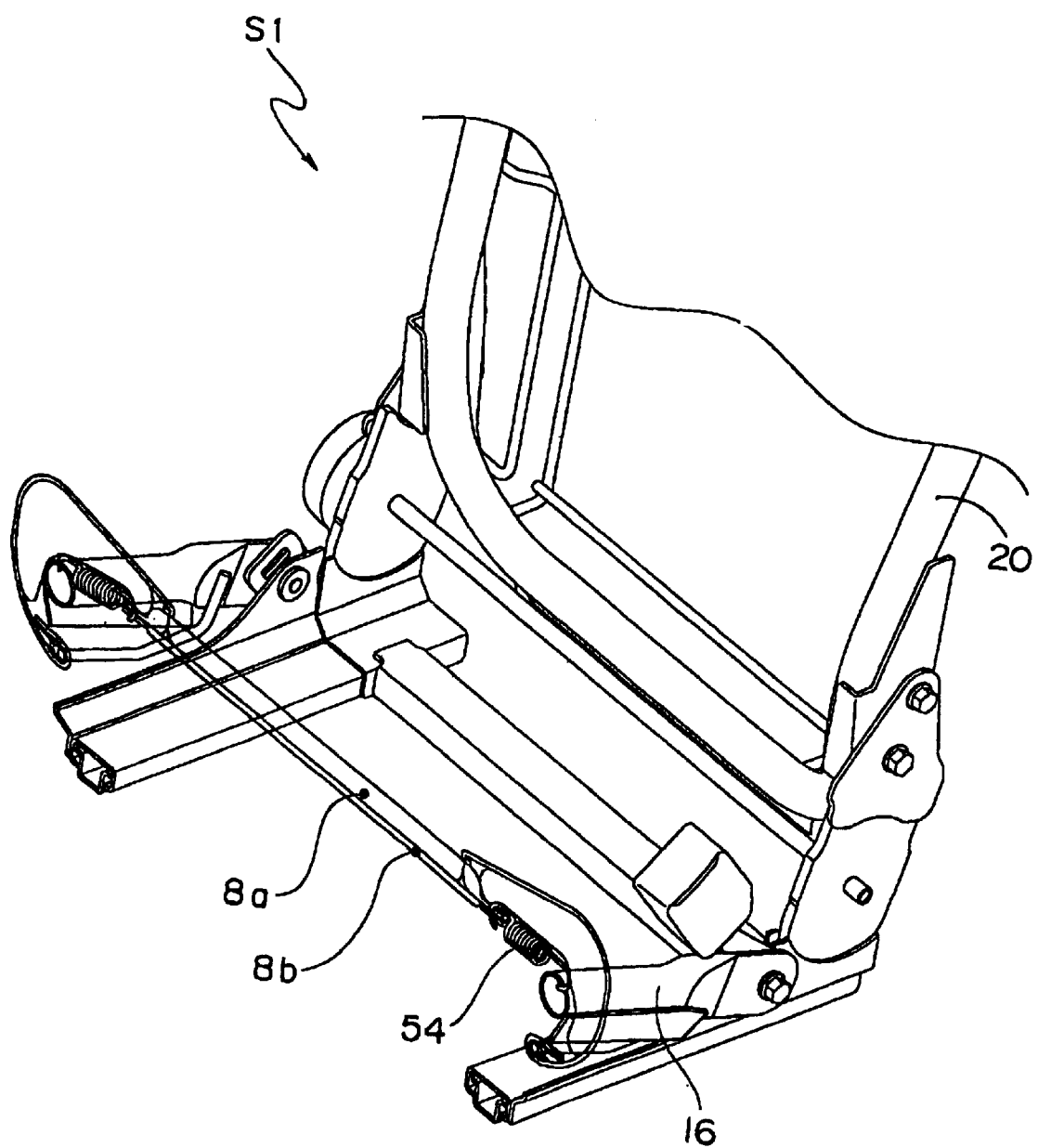
FIG. 17 is a perspective view, partly in section, of a modification of the seat of FIG. 10.

FIG. 17 depicts a modified form of the seat S1 according to the first embodiment of the present invention, wherein a plurality of metal springs 54 (in FIG. 17, only one is shown on each side) are used in place of the tension member 28 shown in FIG. 10 or 12. One end of each metal spring 54 is engaged with the vibration-welded portions of the two laminated 3-D nets 8a, 8b, while the other end thereof is engaged with the seat cushion frame 16 so that the tension of each metal spring 54 may be utilized for the elastic force of the seat cushion 2.

Figure 18A:
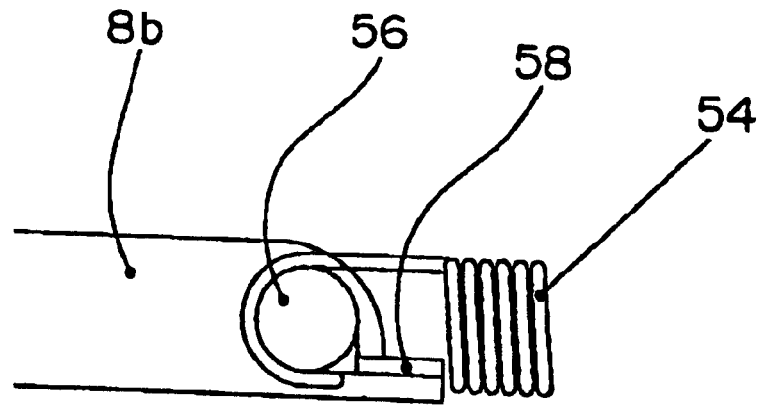
FIG. 18A is a sectional view of an edge portion of the three-dimensional net where the three-dimensional net is engaged with a metal spring.
Figure 18B:
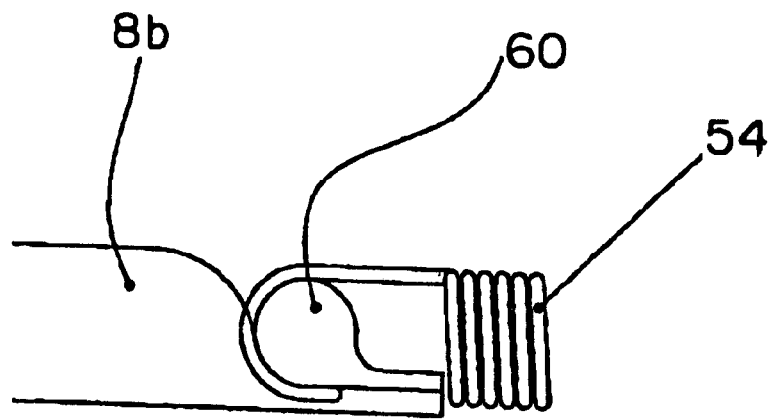
FIG. 18B is a view similar to FIG. 18A, but depicting a modification thereof.
Figure 18C:
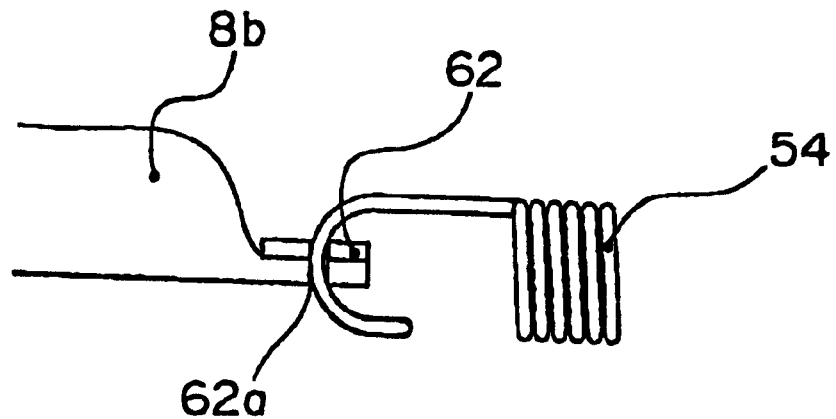
FIG. 18C is a view similar to FIG. 18A, but depicting another modification thereof.

FIGS. 18A, 18B and 18C depict how to engage the 3-D net 8b with the metal spring 54.

In FIG. 18A, a cylindrical rod 56 is embedded in a portion of the 3-D net 8b adjacent to an outer edge thereof, to which a resinous plate 58 is joined. The metal spring 54 is engaged at one end thereof with the cylindrical rod 56.

In FIG. 18B, a resinous member 60 is joined to an outer edge portion of the 3-D net 8b by vibration welding, and the metal spring 54 is engaged at one end thereof with the resinous member 60.

As shown in FIG. 18C, a resinous plate 62 having through-holes 62a defined therein may be joined to the outer edge portion of the 3-D net 8b by vibration welding. In this case, the metal spring 54 is engaged with the resinous plate 62 by inserting one end of the former into one of the through-holes 62a of the latter.

Figure 19:
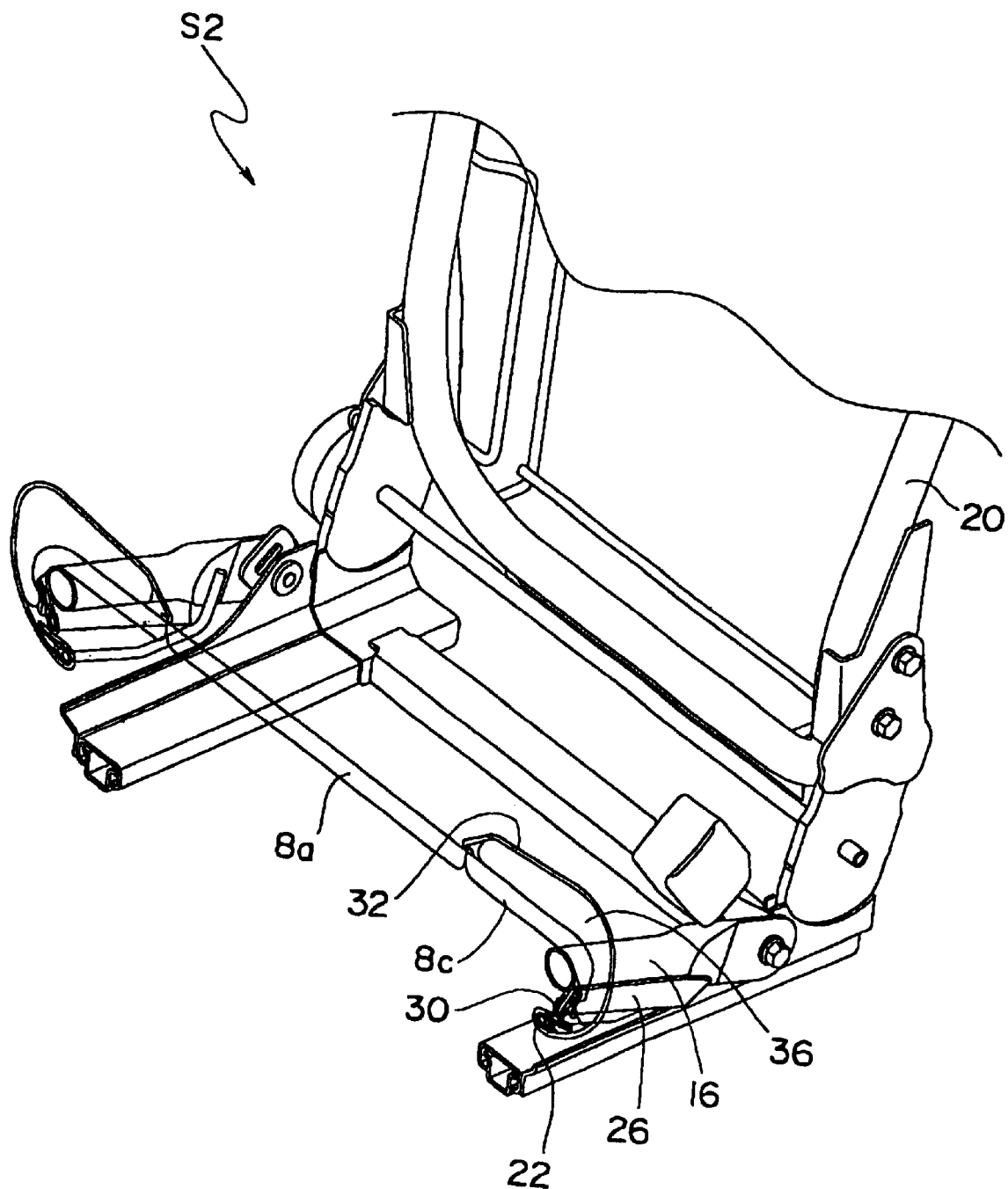
FIG. 19 is a perspective view, partly in section, of a seat according to a second embodiment of the present invention.

FIG. 19 depicts a seat S2 according to a second embodiment of the present invention, which includes only one 3-D net 8a stretched over substantially the entire region of the seat cushion 2 and the seat back 4 so that the spring properties in the direction perpendicular to the 3-D net plane may be imparted by the pile layer.

As shown in FIG. 19, the seat cushion 2 is provided at opposite side portions thereof with respective highly elastic 3-D nets 8c employed as tension members, each of which is joined at an inner edge portion thereof to an edge portion of the 3-D net 8a by vibration welding before, and at an outer edge portion thereof to an engagement member 30 by vibration welding, as shown in FIG. 12. The engagement member 30 is engaged with a plate 26 secured to the seat cushion frame 16. The 3-d NET identified by 09038D in Table 1 is preferably used for the 3-D net 8c employed as the tension member.

The skin 32 is sewn at an inner edge portion thereof to the vibration-welded portion of the two 3-D nets 8a, 8c, and is engaged at an outer edge portion thereof with the wires 22 in the same manner as in FIG. 12. Furthermore, a urethane-based pad material 36 is interposed between the skin 32 and the tension member 8c to relieve the feeling of foreign substances in sitting conditions.

Because the other construction (for example, engagement of the front end portion of the seat cushion 2 or the edge portion of the seat back 4) is the same as that in the first embodiment of the present invention, explanation thereof is omitted.

Figure 20:
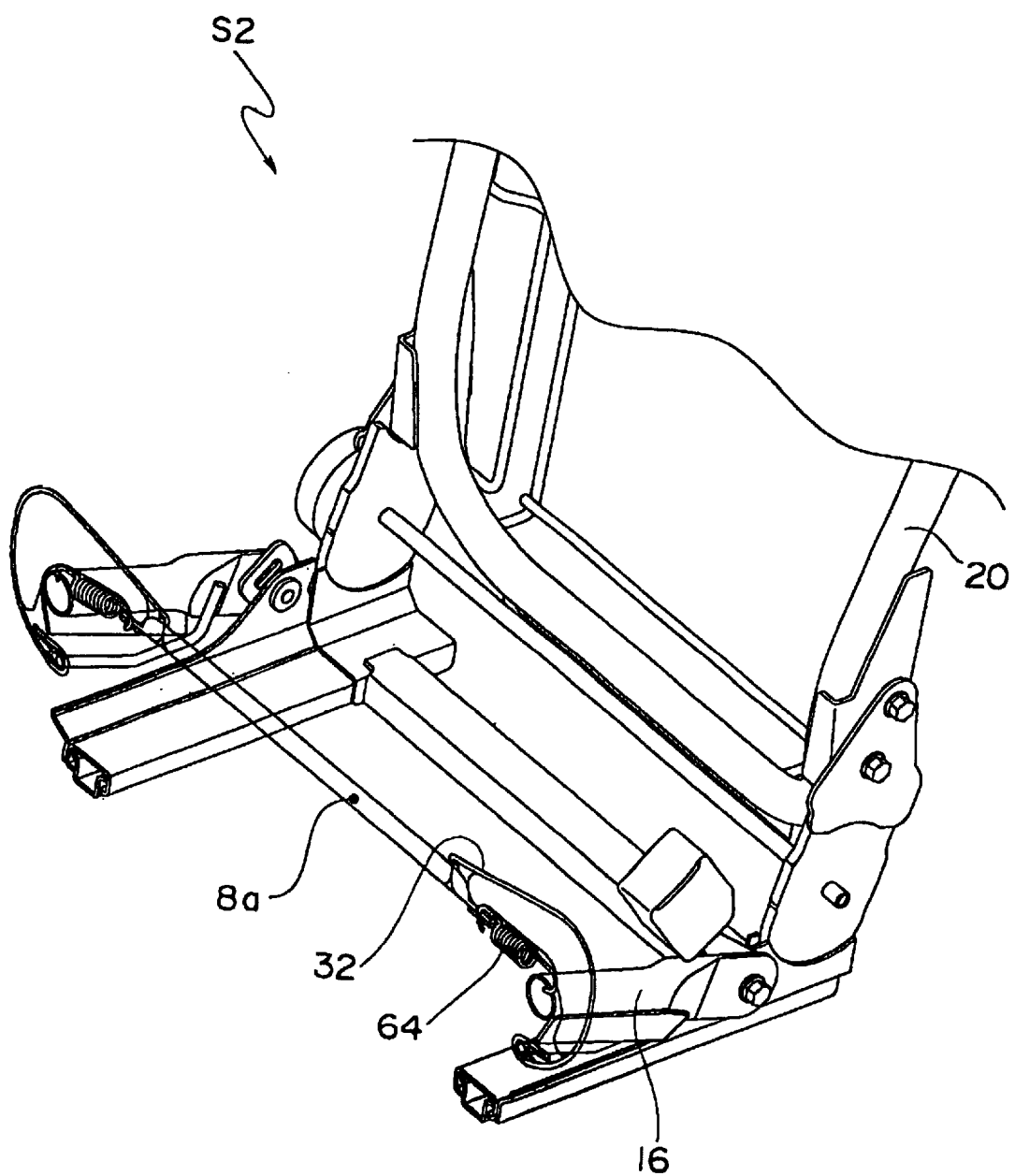
FIG. 20 is a view similar to FIG. 19, but depicting a modification thereof.

FIG. 20 depicts a modification of the second embodiment of the present invention, wherein a plurality of metal springs 64 (in the figure, only one is shown on each side) are used in place of the tension members 8c shown in FIG. 19. Each metal spring 64 is engaged at one end thereof with the welded portion of the 3-D net 8a and at the other end thereof with the seat cushion frame 16 so that the tension of the metal spring 64 may be utilized as an elastic force of the seat cushion 2.

Figure 21:
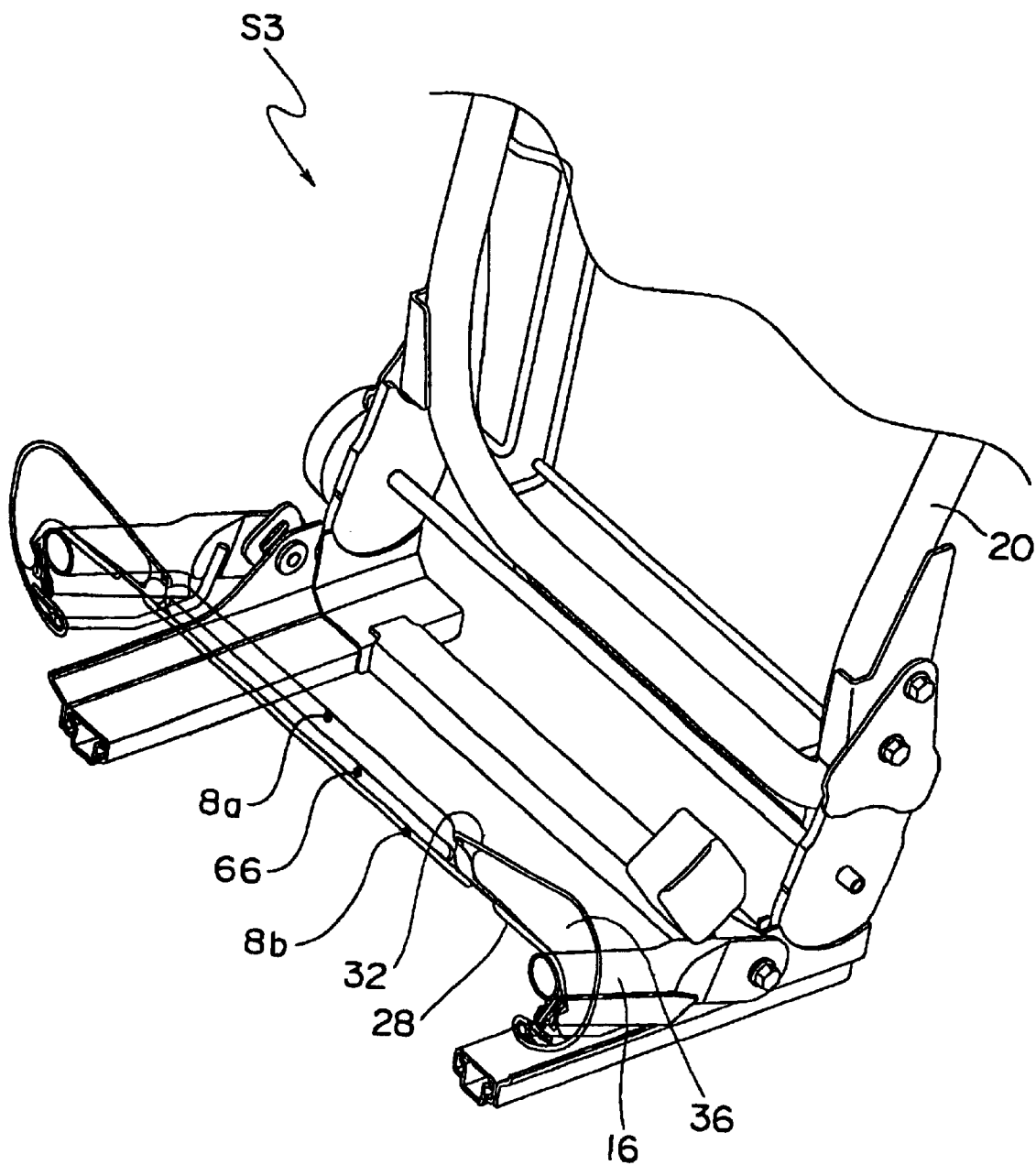
FIG. 21 is a perspective view, partly in section, of a seat according to a third embodiment of the present invention.

FIG. 21 depicts a seat S3 according to a third embodiment of the present invention, which includes two 3-D nets 8a, 8b laminated one upon the other and stretched over substantially the entire region of the seat cushion 2 and the seat back 4 with urethane-based pad material 66 of an about 10 mm thickness interposed therebetween so that the spring properties in the direction perpendicular to the 3-D net plane may be imparted by the two 3-D nets 8a, 8b and the pad material 66.

Figure 22:
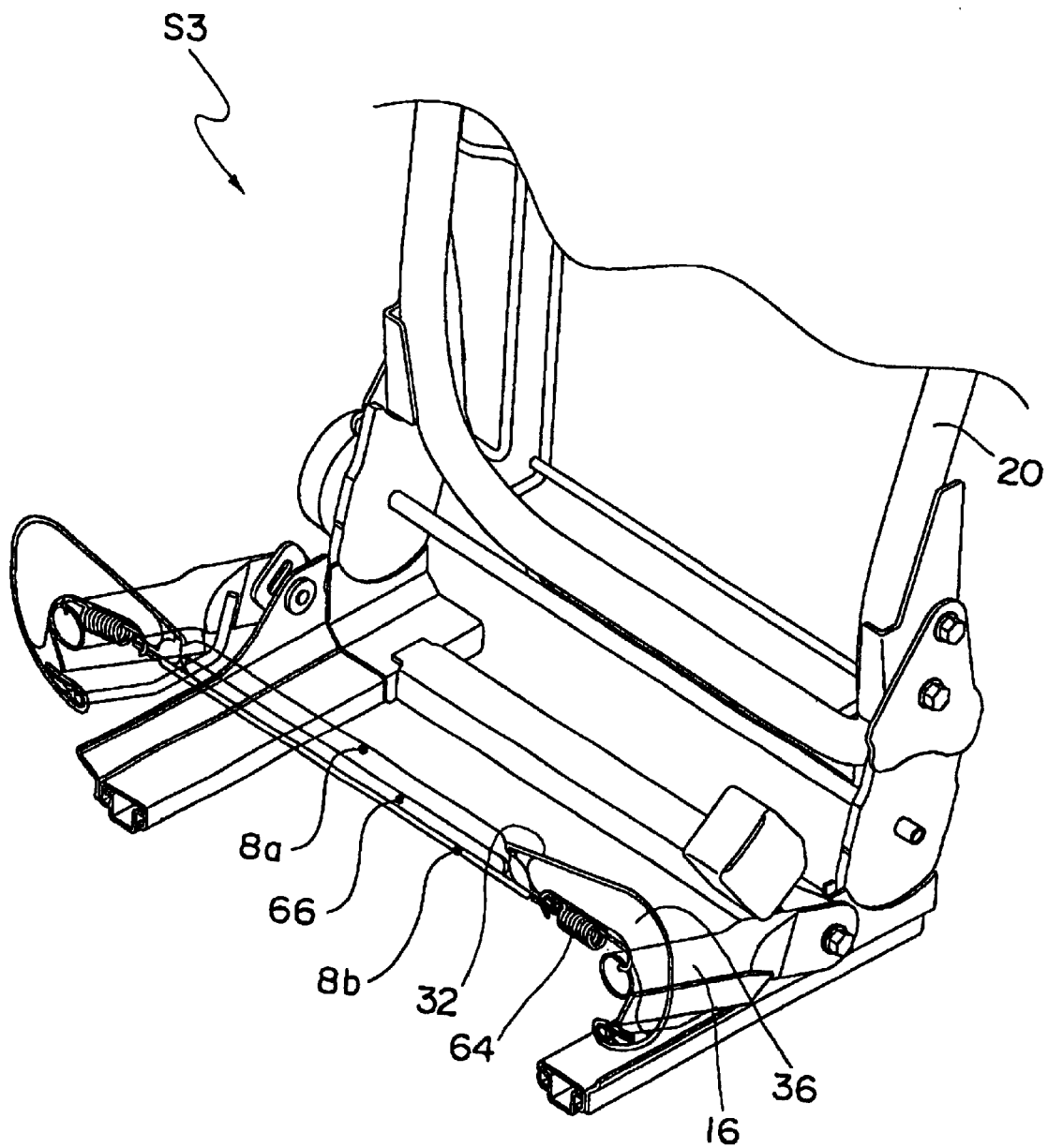
FIG. 22 is a view similar to FIG. 21, but depicting a modification thereof.

FIG. 22 depicts a modification of the third embodiment of the present invention, wherein a plurality of metal springs 64 are used in place of the tension members 28.

Because the other construction of the seat S3 shown in FIG. 21 or 22 is the same as that of the seat S1 shown in FIG. 10 or 17, explanation thereof is omitted.

Figure 23:
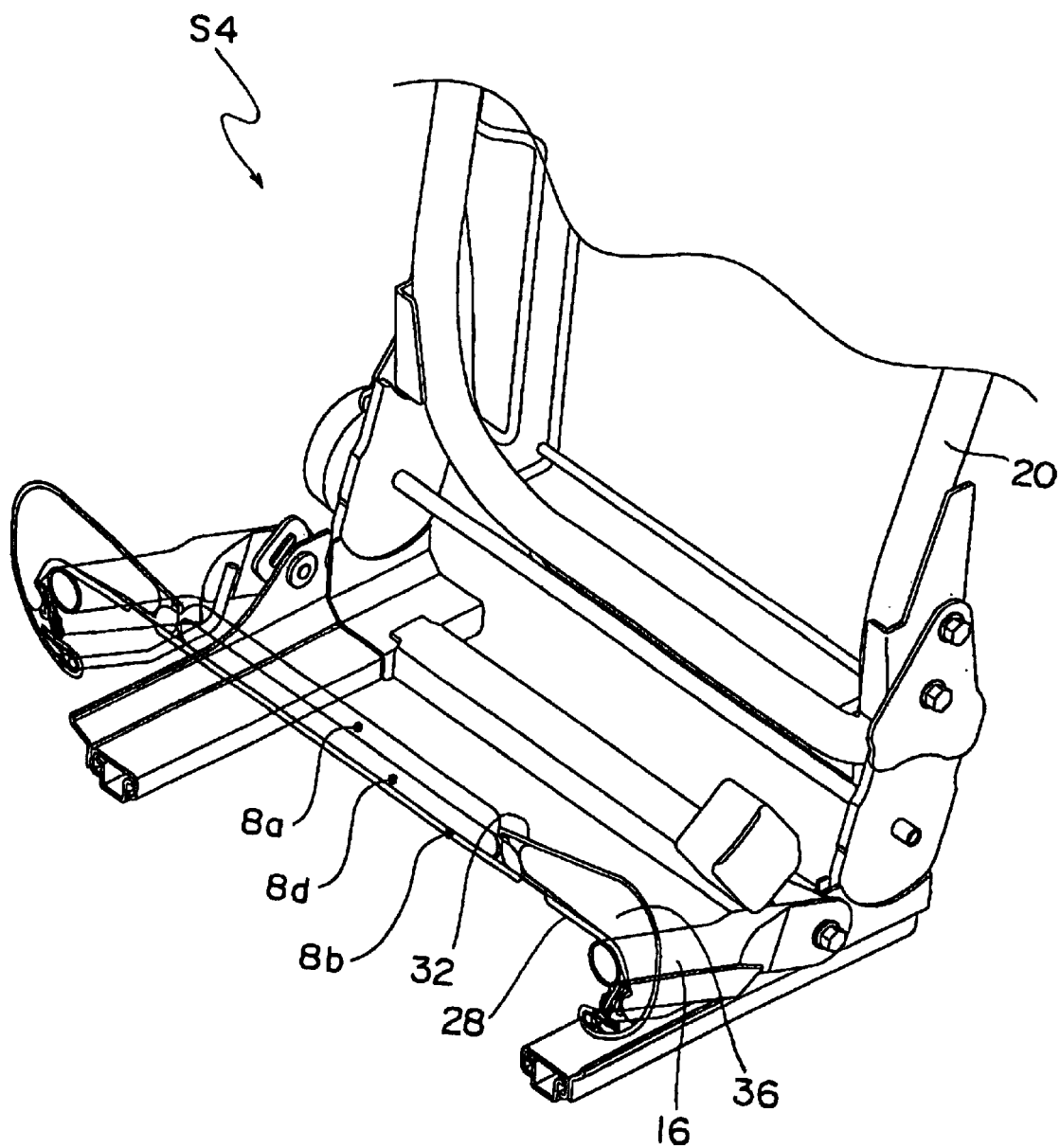
FIG. 23 is a perspective view, partly in section, of a seat according to a fourth embodiment of the present invention.
Figure 24:
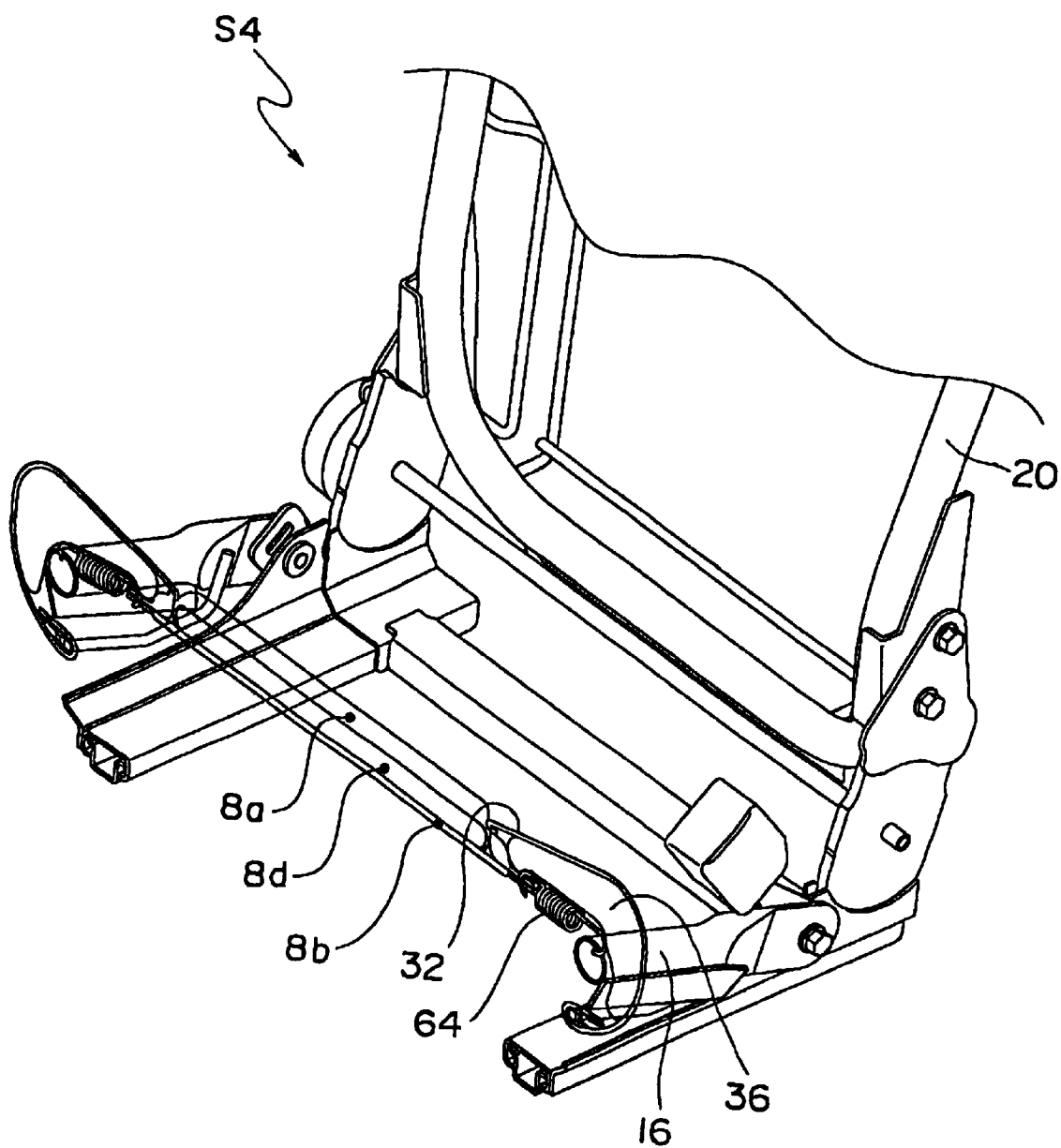
FIG. 24 is a view similar to FIG. 23, but depicting a modification thereof.
Figure 25:
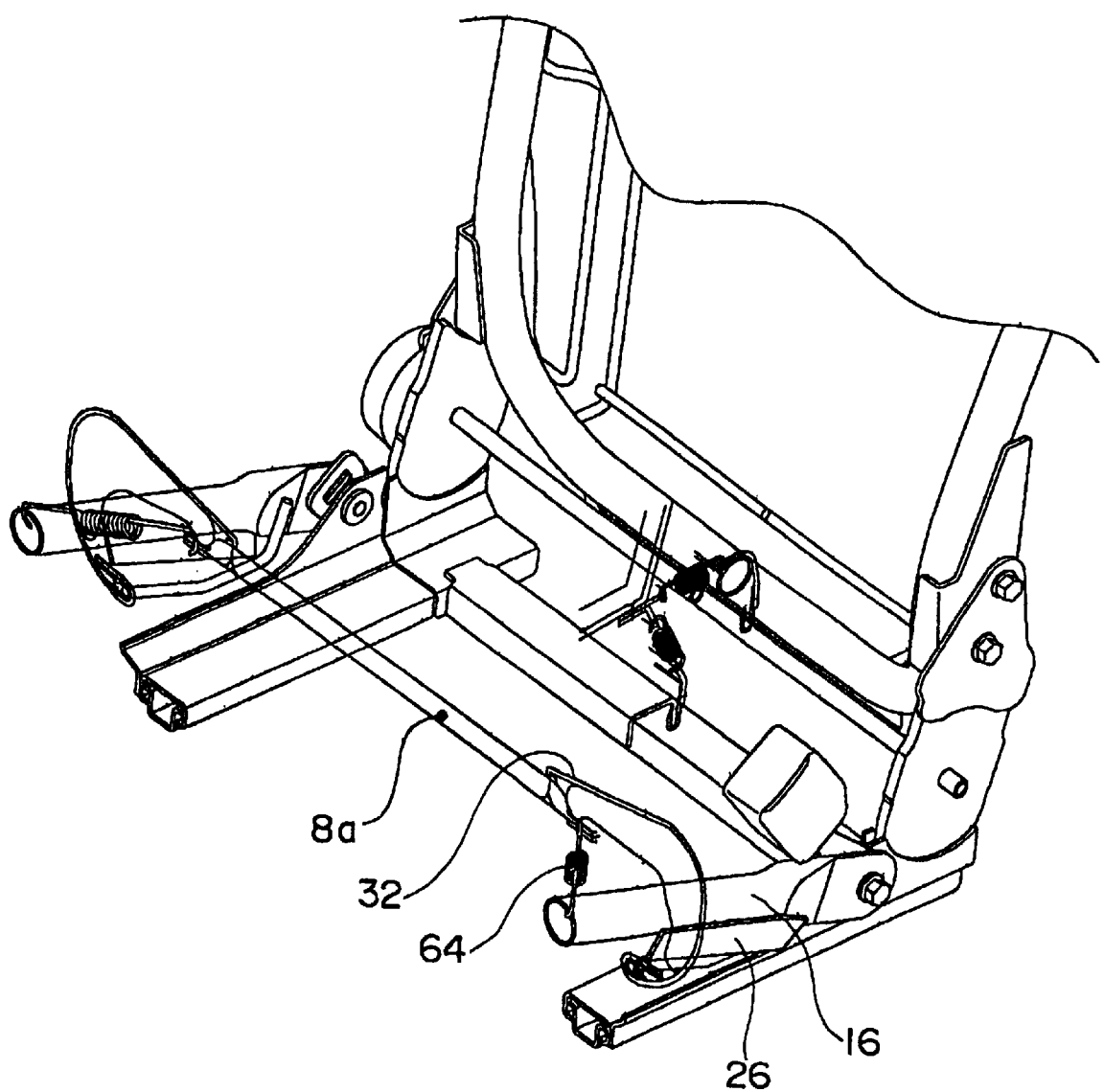
FIG. 25 is a view similar to FIG. 24, but depicting the case where metal springs employed as tension members are attached so as to extend laterally obliquely.
Figure 26:
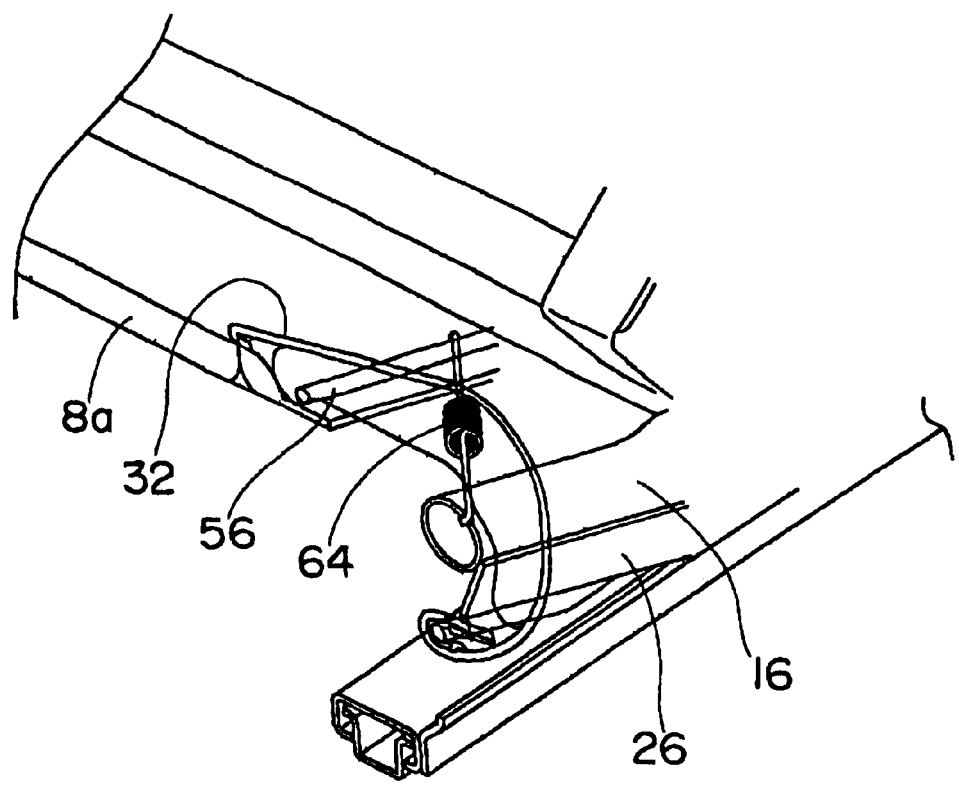
FIG. 26 is an enlarged view of a portion of FIG. 25.

FIGS. 23 and 24 depict a seat S4 according to a fourth embodiment of the present invention and a modification thereof, respectively, wherein a 3-D net 8d is used in place of the pad material 66 shown in FIG. 21 or 22. The 3-D net identified by 09041D in Table 1 is preferably used for the 3-D net 8d.

Where the metal springs 54, 64 are used as the tension members, they are attached so as to extend laterally (in the widthwise direction). As shown in FIGS. 25 and 26, however, the metal springs 64 may be attached so as to extend laterally obliquely (at a predetermined angle with respect to the lateral direction).

Although the space between the edge portion of the 3-D net with which the metal springs 64 are engaged and the seat cushion frame 16 is limited, the construction shown in FIGS. 25 and 26 allows the use of various metal springs having different lengths, making it possible to impart desired spring properties to the seat cushion 2.

Figure 27:
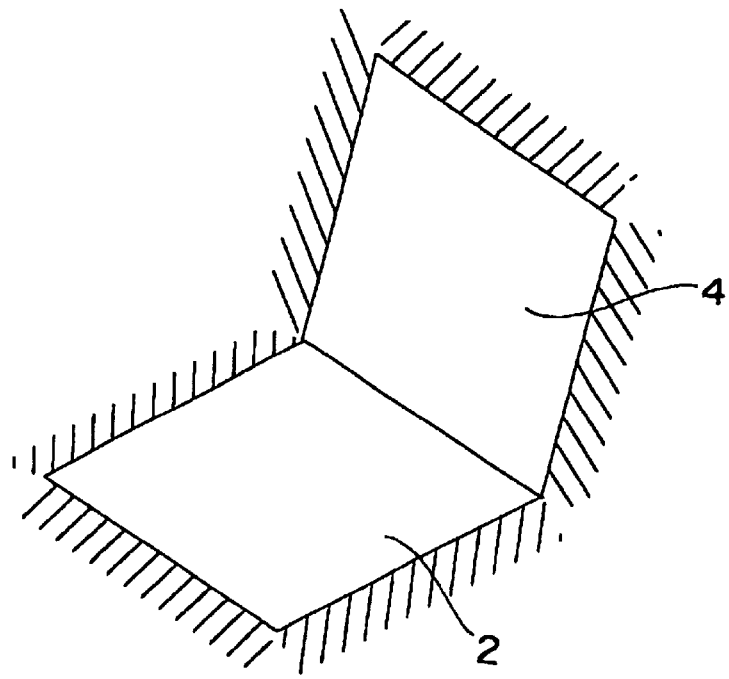
FIG. 27 is a schematic view showing the support conditions of the three-dimensional net employed in the seat of FIG. 19 or 20.
Figure 28:
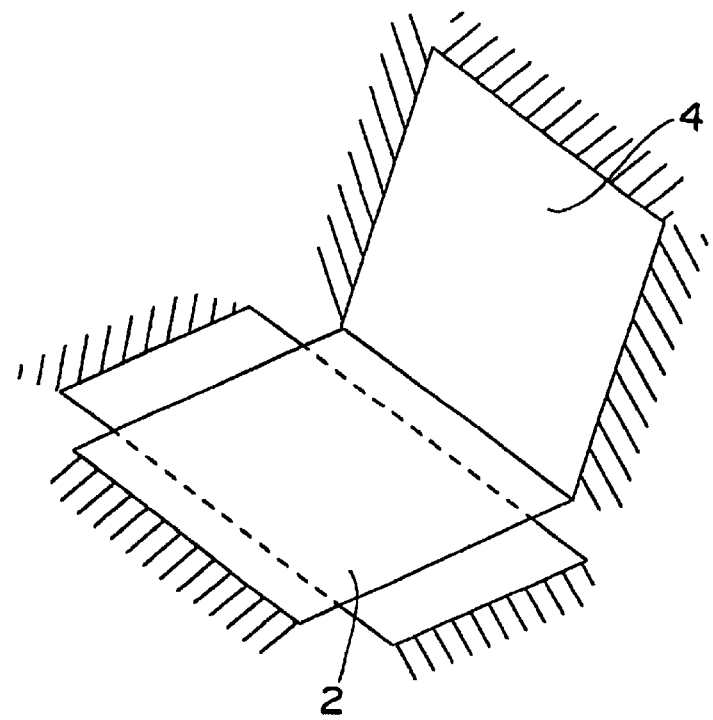
FIG. 28 is a view similar to FIG. 27, but depicting the support conditions of the three-dimensional net employed in the seat of FIGS. 10, 17, 21, 22, 23 or 24.

FIGS. 27 and 28 schematically depict the support conditions (including the fixed ends and the ends engaged with the tension members) of the seat according to the present invention. In particular, FIG. 27 depicts the support conditions of the seat S2 shown in FIGS. 19 and 20, while FIG. 28 depicts those of the seat S1 shown in FIGS. 10 and 17, the seat S3 shown in FIGS. 21 and 22, and the seat S4 shown in FIGS. 23 and 24.

In the single-layered structure, as shown in FIG. 27, all the periphery of the seat cushion 2 and the seat back 4 is fixed to the seat cushion frame 16 and the seat back frame 20 or engaged therewith via the tension members. On the other hand, in the laminated structure, as shown in FIG. 28, the periphery of the seat back 4 is engaged with the seat back frame 20, while the lower 3-D net 8b constituting the seat cushion 2 is engaged at the opposite side portions thereof with the seat cushion frame 20, and the upper 3-D net 8a is engaged at the front end portion thereof with the seat cushion frame 20 and is softly or lightly fixed at the opposite side portions thereof to the seat cushion frame 20 via the pad material.

Figure 29:
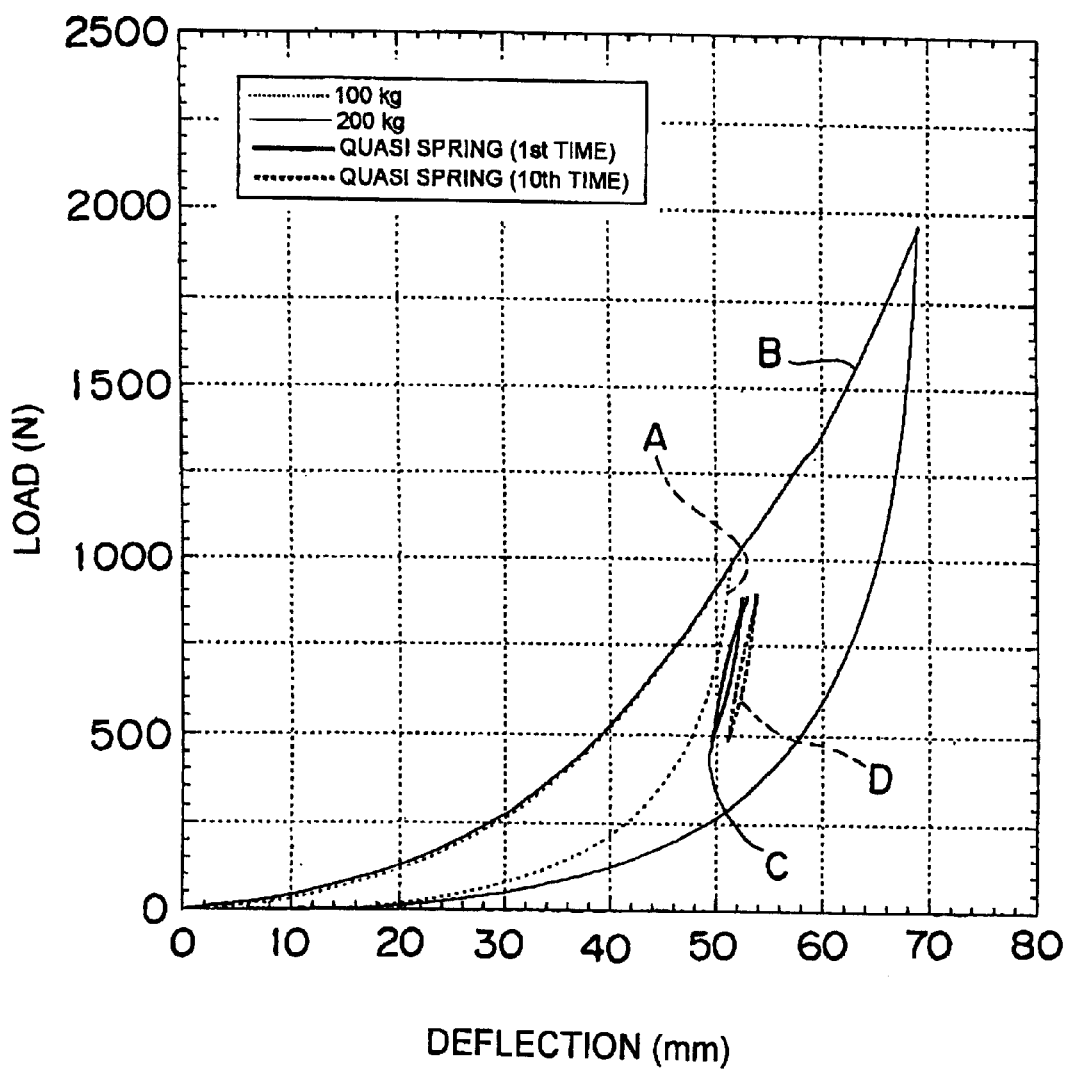
FIG. 29 is a graph showing the static characteristics of the seat of FIG. 10.

FIG. 29 is a graph showing the static characteristics of the seat S1 according to the first embodiment of the present invention. In the figure, "A" and "B" show the static characteristics when a load of 100 kg and a load of 200 kg were applied, respectively, while "C" and "D" show the case where an iron plate was pressed only once at a speed of 100 mm/min and the case where it was pressed ten times at the same speed, respectively, with a load of 90 to 50 kg in accordance with the test method conforming to JASO.

As can be seen from the graph of FIG. 29, the seat S1 has a large hysteresis compared with an elastic material such as urethane. Accordingly, where this seat is used as an automobile seat, it can effectively absorb vibration energy inputted from the outside. Also, because any large change in deflection is not caused even if the load is changed from 90 kg to 50 kg, the seat S1 absorbs a change in load applied to the seat occupant.

Figure 30:
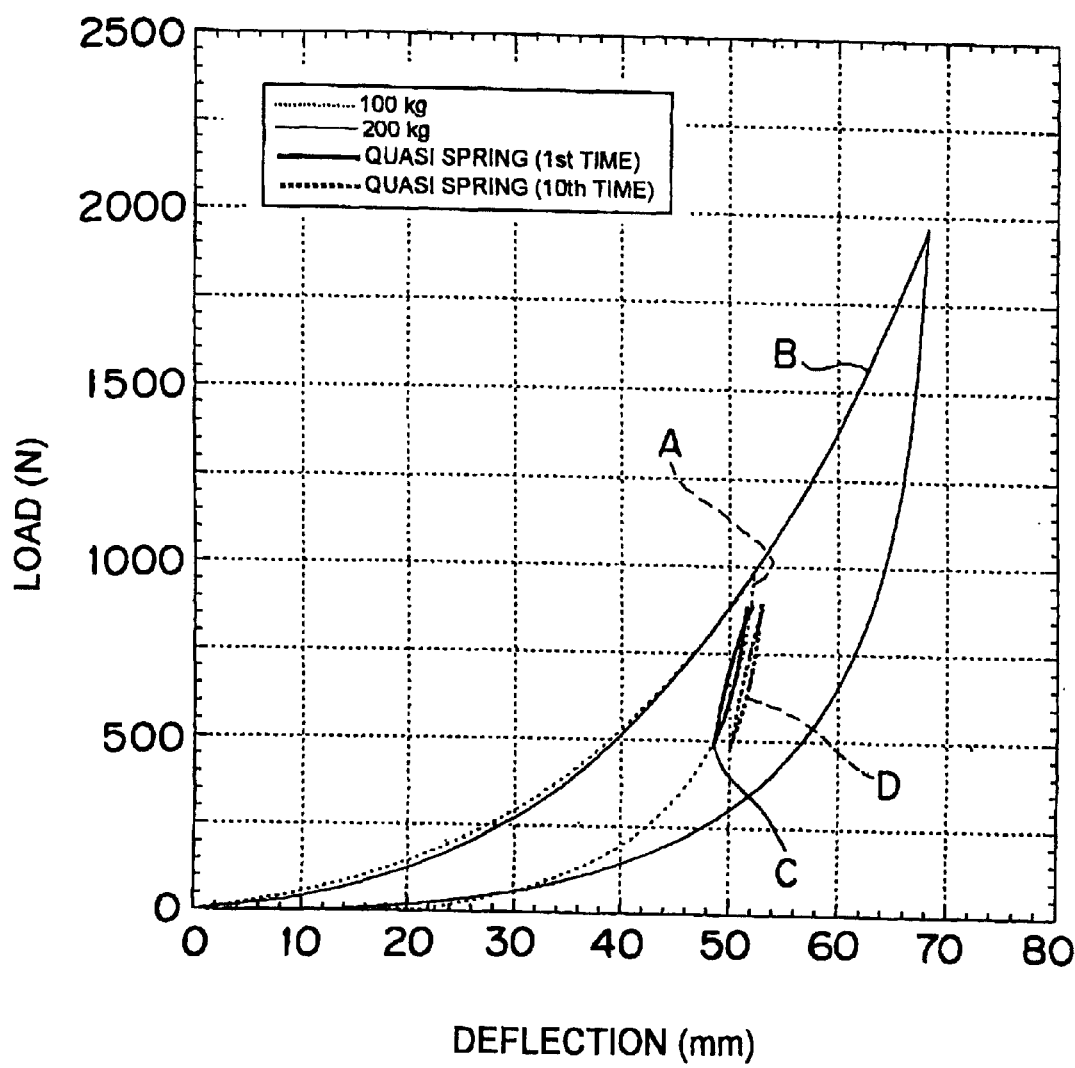
FIG. 30 is a graph showing the static characteristics of the seat of FIG. 21.
Figure 31:
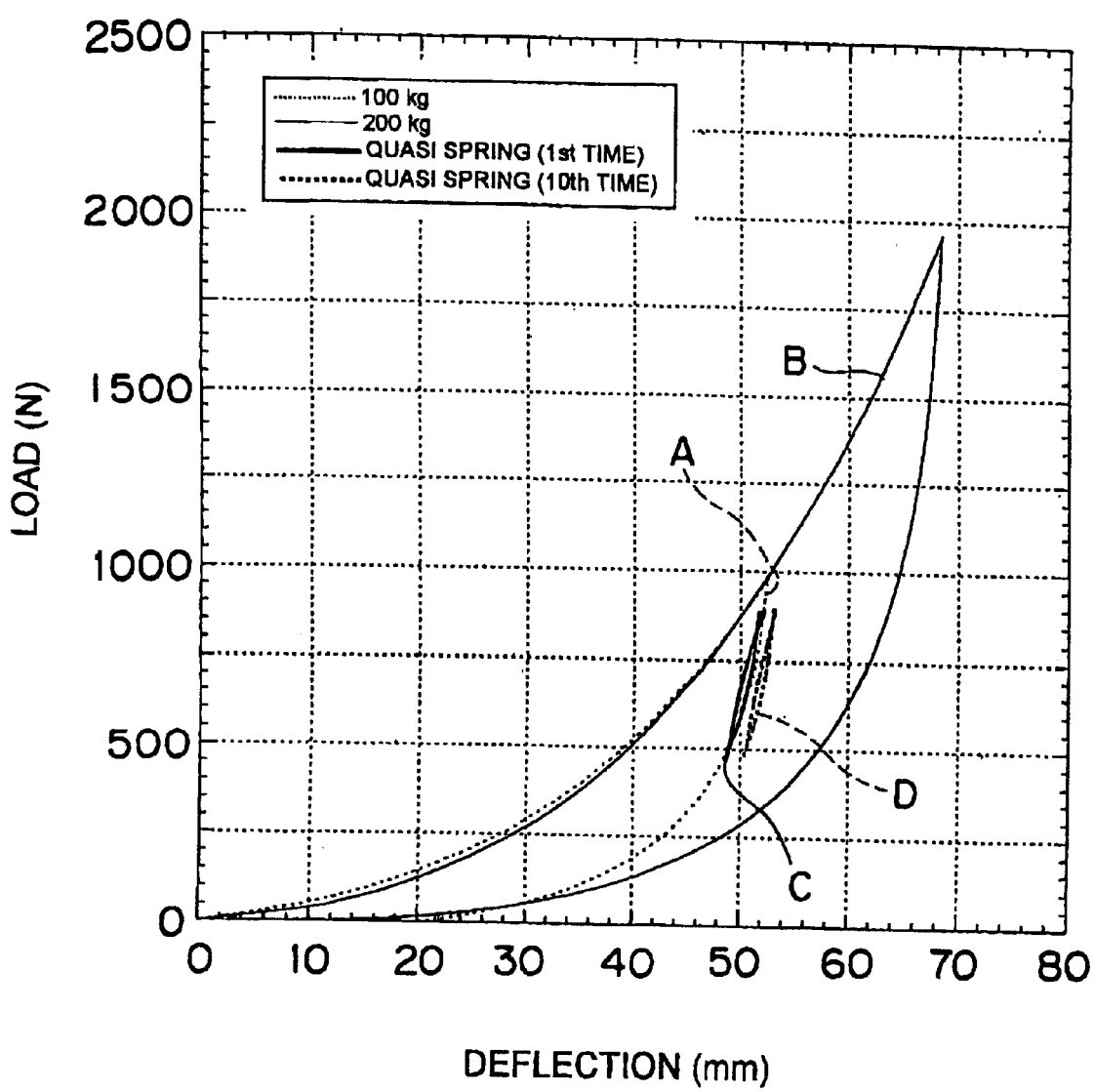
FIG. 31 is a graph showing the static characteristics of the seat of FIG. 23.
Figure 32:
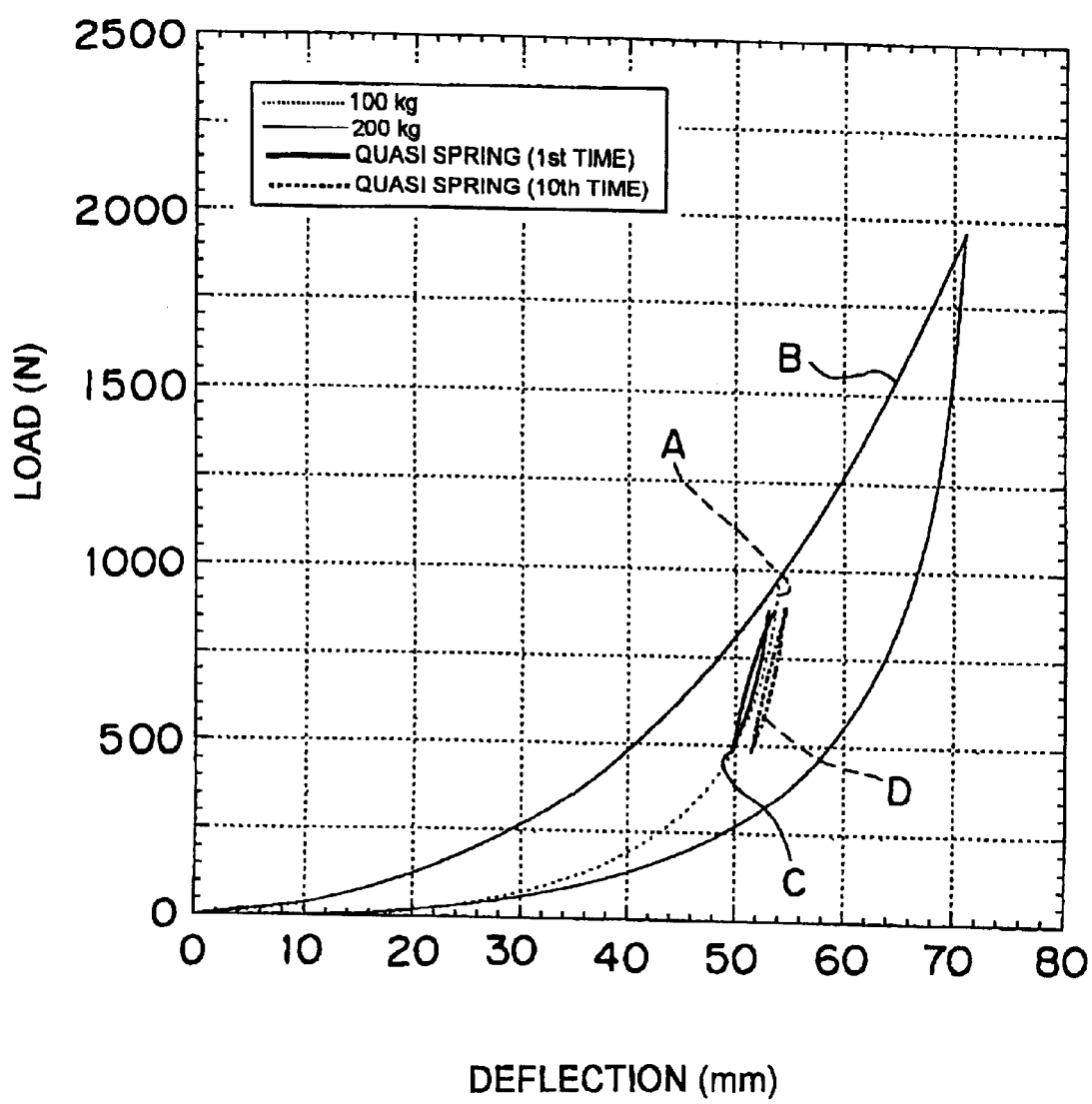
FIG. 32 is a graph showing the static characteristics where a three-dimensional net was placed on the seat of FIG. 10.

FIGS. 30 and 31 depict the static characteristics of the seat S3 according to the third embodiment of the present invention and those of the seat S4 according to the fourth embodiment of the present invention, respectively. FIG. 32 depicts the static characteristics of a comparative example, in which a 3-D net having a thickness of 10 mm was placed on the seat S1 according to the first embodiment of the present invention.

The graphs of FIGS. 30 and 31 reveal that even if the laminated structure provides the spring properties, no large change in damping characteristics is caused, but series lamination positively reduces the spring constant. Because of this, the resonant frequency on the cushion side decreases, and there arises a difference between it and the resonant frequency on the back side, thus giving rise to an antiresonant state. Such a state reduces acceleration in a resonant region of the internal organs.

Figure 33:
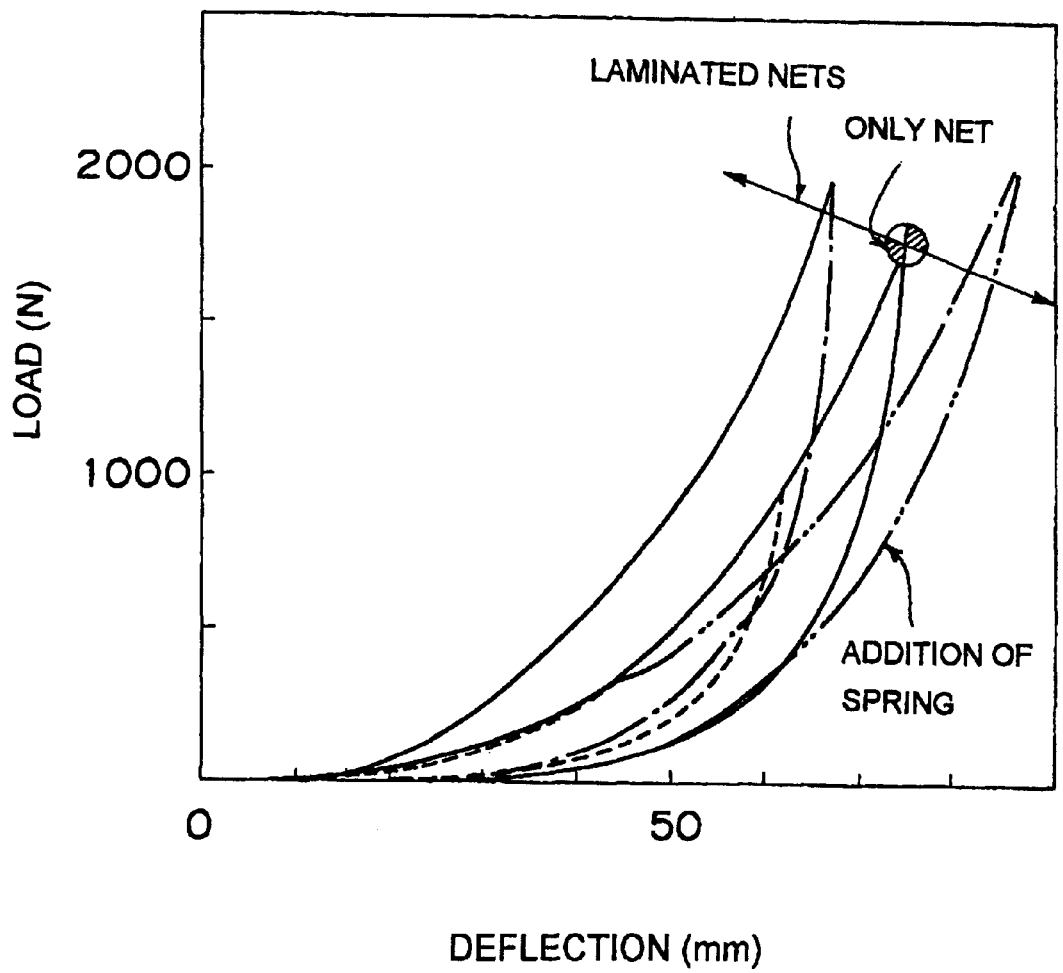
FIG. 33 is a graph showing the static characteristics of various seats according to the present invention.

FIG. 33 depicts a tendency in the static characteristics of only a 3-D net, a laminated structure of 3-D nets, and a structure in which the 3-D net was combined with tension members such as metal springs.

Compared with only the 3-D net, the laminated structure of the 3-D nets absorbs vibrations by making use of the dynamic spring characteristics imparted by a damping system and the soft spring characteristics imparted by the lamination, thus relieving a stiff feeling in a high-frequency region and providing a soft riding feeling. In the case of the structure added with the tension members such as metal springs, the spring properties are strengthened and the acceleration in a low-frequency region increases to some extent, but high-frequency vibrations inputted are attenuated by an anti-phase of the spring system.

Figure 34:
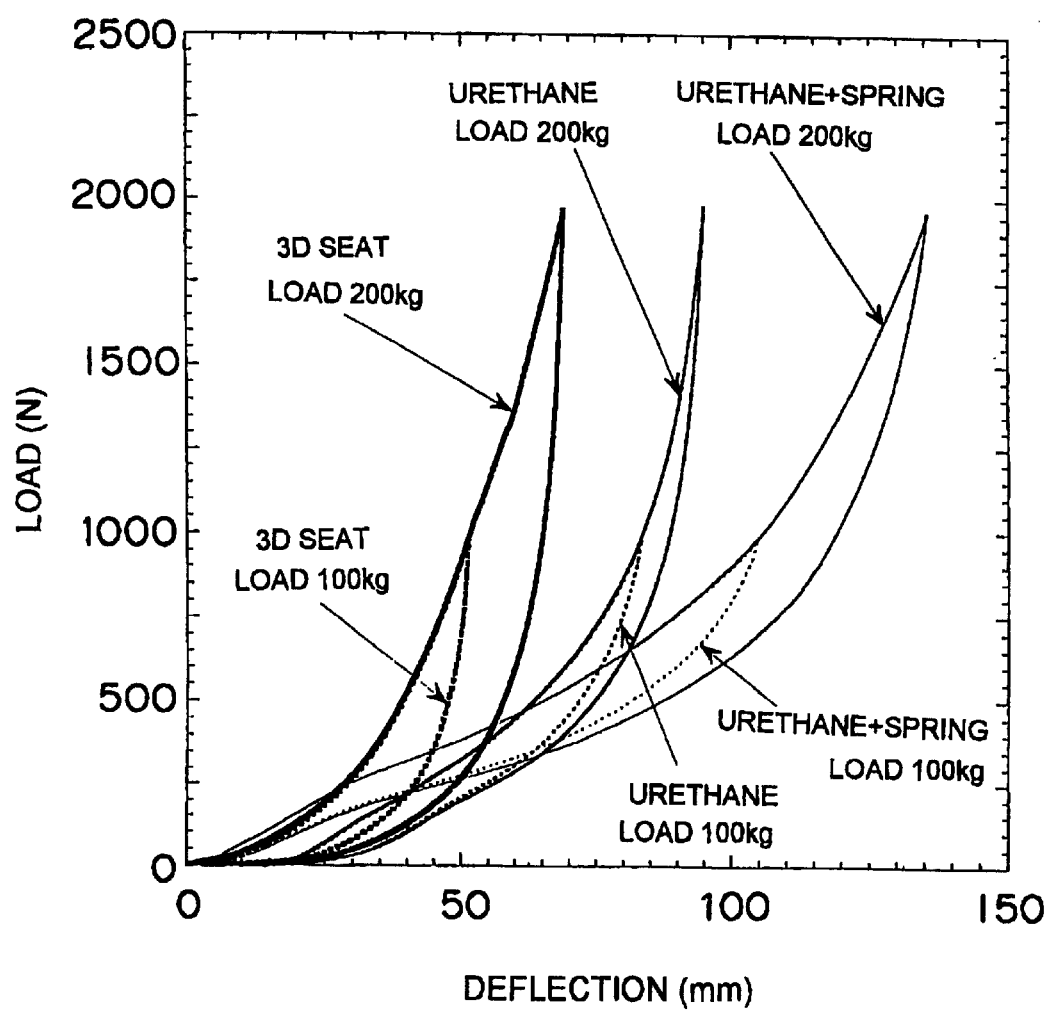
FIG. 34 is a graph showing the static characteristics of the seat according to the present invention and those of the conventional seats.

FIG. 34 is a graph showing the static characteristics of a 3-D net according to the present invention, that of a conventional seat made of only urethane, and that of another conventional seat having a combination of urethane and springs.

As can be seen from this graph, an elastic material having a small hysteresis loss is used in the conventional seats, whereas a damping material having a large hysteresis loss is used in the 3-D net according to the present invention.

In the 3-D net, the hysteresis loss is caused by such a structural damping as friction between the piles, which cannot be provided by urethane i.e., an internal damping material utilizing elastic energy, and the spring characteristics of the base material ensures the restoring properties. Also, incorporation of the 3-D net into the hammock structure makes it possible to absorb vibrations while absorbing inertia forces.

Figure 35:
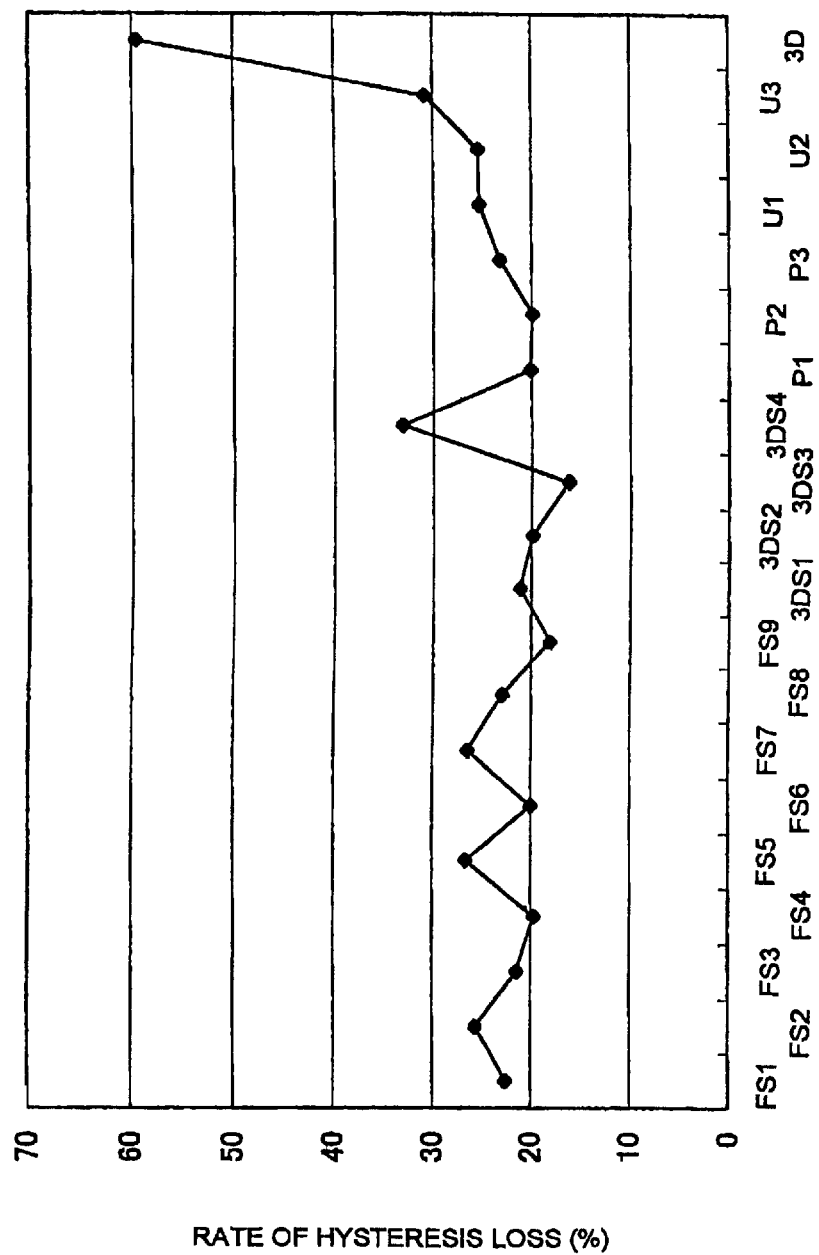
FIG. 35 is a graph showing the rate of hysteresis loss of the seat according to the present invention and those of the conventional seats.

FIG. 35 is a graph showing the rates of hysteresis loss of conventional automobile seats and the rate of hysteresis loss of a 3-D net seat. In FIG. 35, FS1–FS9 represent the conventional automobile seats having a generally flat spring assembly, 3DS1–3DS4 represent those having a three-dimensional spring assembly, P1–P3 represent those having "PULLMAFLEX", U1–U3 represent those made of urethane, and 3D represents a 3-D net seat according to the present invention. It can be readily comprehended from this graph that the 3-D net is a material having a large damping factor.

Figure 36:
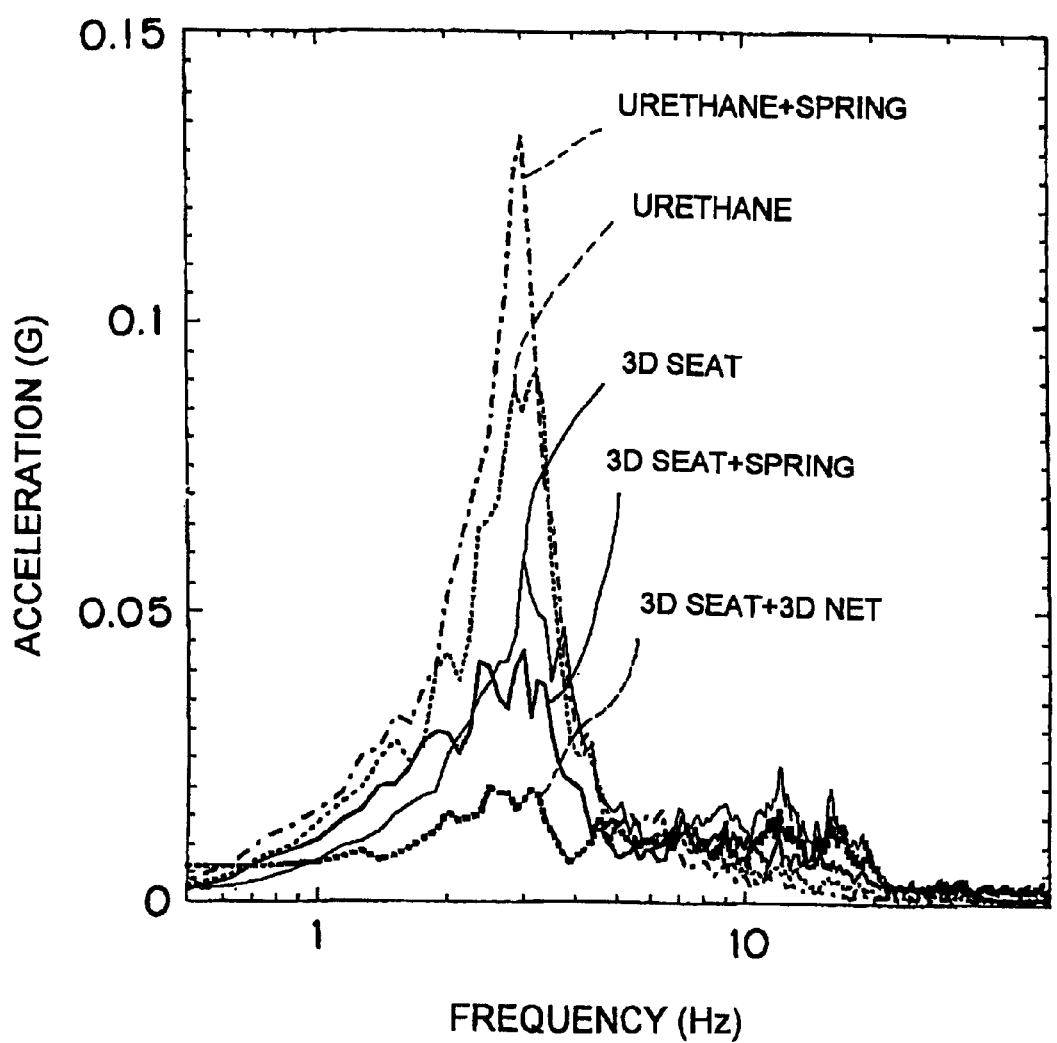
FIG. 36 is a graph showing the dynamic characteristics of the seats according to the present invention and those of the conventional seats.

FIG. 36 depicts vibration characteristics when automotive vehicles with a conventional seat or a 3-D net seat ran on a metropolitan road at 80 km/hour. The weight of a subject was 92 kg.

As can be seen from the graph of FIG. 36, an acceleration at a resonant frequency is lower in the 3-D net seat according to the present invention than in the conventional seat utilizing urethane or that utilizing urethane and metal springs. Accordingly, the 3-D net seat provides a riding comfort by reducing a change in acceleration from the low-frequency region to the high-frequency region.

Figure 37:
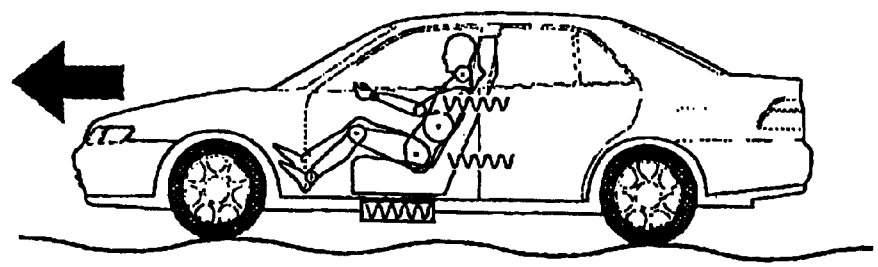
FIG. 37 is a schematic view of an automotive vehicle running on a generally straight road.
Figure 38:
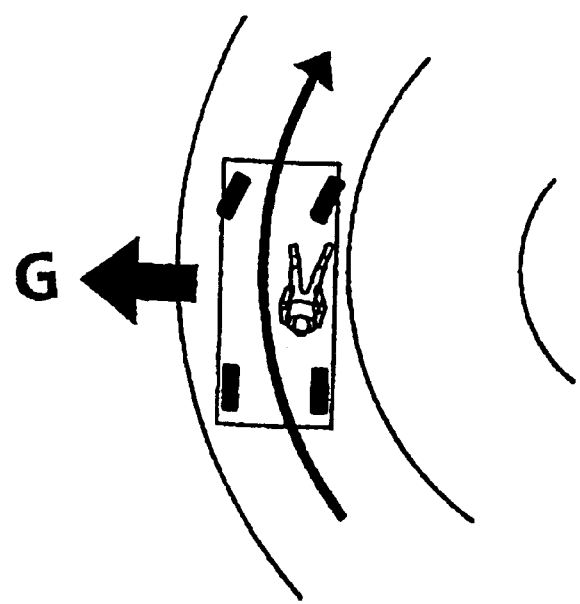
FIG. 38 is a schematic view of an automotive vehicle running on a curved road.

It is conceivable that external factors having influence on the human body include vibrations (accelerations) inputted to the human body via the floor or seat during running on a generally straight road and caused by the surface of the road, the wheel base component, and the like, as shown in FIG. 37, and also include accelerations acting on the human body and caused by inertia forces exerted on the vehicle body, as shown in FIG. 38.

If the human body is supported by the seat, steering wheel or foot (knee) rest against the inertia forces acting on the human body, the human body tends to be pushed or sprung up by the seat in, for example, a back slap mode. As a result, muscles are required to support the body, and the physical strength is consumed in actions other than the driving action, thus bringing about fatigue.

On the other hand, if the human body is supported against a change in acceleration (load) with the use of the cushion body that undergoes no great deflection and the hammock structure, a change in acceleration is effectively absorbed. In addition, because the cushion body having a comparatively large damping factor causes only a small reaction force for the support of the human body, the sway of the human body is reduced, making it possible to take the optimized driving posture.

Moreover, by combining the cushion structure having a large damping factor and a restoring force with the three-dimensional hammock structure, by imparting the spring properties to the tension members, and by imparting the spring properties in the direction perpendicular to the seating surface, the resonant frequency is reduced, and the capability of retaining the posture and the capability of absorbing vibrations are enhanced.

It is to be noted that although in the above-described embodiments the 3-D net or nets are applied to an automobile seat wherein a seat back is pivotally mounted on a seat cushion, the present invention is not limited to the automobile seat, but is applicable to a seat having a seat cushion and a seat back integrated together or any other seat.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A seat having a three-dimensional net, comprising:
   a seat cushion frame;
   a seat back frame mounted to the seat cushion frame;
   a first three-dimensional net having upper and lower mesh layers and a pile layer having a large number of piles for connecting the upper and lower mesh layers, the first three-dimensional net being stretched over substantially an entire region of the seat cushion frame and the seat back frame, thereby forming a seat cushion and a seat back, the first three-dimensional net having a fixed end at a front end portion of the seat cushion and another fixed end at an upper end portion of the seat back;
   a first tension member attached to the first three-dimensional net at a location adjacent to a central portion thereof for imparting tension thereto; and
   a second tension member attached to another portion of the first three-dimensional net for fastening the first three-dimensional net to at least one of the seat cushion frame and the seat back frame.

2. The seat according to claim 1, wherein the seat cushion frame and the seat back frame are selectively covered with a pad material, which is in turn covered with a skin.

3. The seat according to claim 1, wherein each of the first and second tension members comprises one of a highly elastic three-dimensional net, a metal spring, and a stretch material made of rubber.

4. The seat according to claim 1, further comprising a second three-dimensional net laminated on the first three-dimensional net.

5. The seat according to claim 4, further comprising a pad material interposed between the first and second three-dimensional nets.

* * * * *